United States Patent [19]

Hirata et al.

[11] Patent Number: 4,948,237

[45] Date of Patent: Aug. 14, 1990

[54] PROJECTION LENS SYSTEM

[75] Inventors: Koji Hirata, Yokohama; Kyohei Fukuda, Fujisawa; Hiroki Yoshikawa, Hiratsuka; Shigeru Mori, Chigasaki; Masayuki Muranaka, Yokohama; Isao Yoshizaki, Yokohama; Shigeru Inaoka, Yokohama; Hiroshi Jitsukata, Yokohama, all of Japan

[73] Assignee: Hitachi, Ltd., Tokyo, Japan

[21] Appl. No.: 188,482

[22] Filed: Apr. 29, 1988

[30] Foreign Application Priority Data

Dec. 9, 1987 [JP] Japan ................................. 62-309604
Apr. 8, 1988 [JP] Japan ................................. 63-85070

[51] Int. Cl.$^5$ ............................................. G02B 13/18
[52] U.S. Cl. ..................................... 350/432; 350/412
[58] Field of Search ........................ 350/412, 432–435

[56] References Cited

U.S. PATENT DOCUMENTS 4,699,476 10/1987 Clarke ................................. 350/412
4,699,477 10/1987 Clarke ................................. 350/412
4,824,224 4/1989 Fukuda et al. ................... 350/412 X Primary Examiner—Scott J. Sugarman
Attorney, Agent, or Firm—Antonelli, Terry, Stout & Kraus

[57] ABSTRACT

In a projection system wherein an optical system comprising a first lens for correcting a spherical aberration dependent on the aperture length, a second lens for enlargement and a third lens for correcting a field curvature, projects an image reproduced on a CRT having a curved phosphor surface, onto a screen, the third lens is spaced from the CRT so that the region of the phosphor surface which again totally reflects a light which has been totally reflected by a screen-side surface of the third lens is limited to the edge portion of an effective region of the phosphor surface.

21 Claims, 14 Drawing Sheets

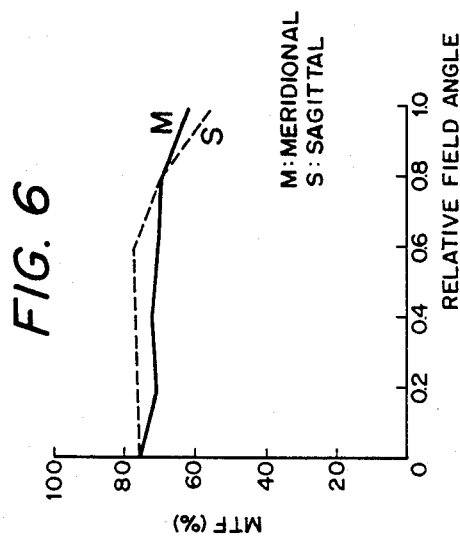
FIG. 6
M:MERIDIONAL
S:SAGITTAL
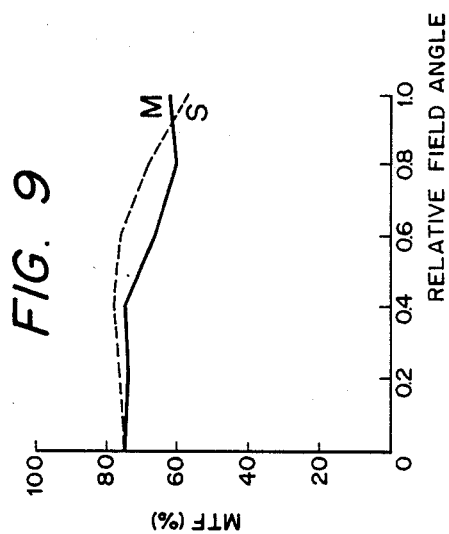
FIG. 8
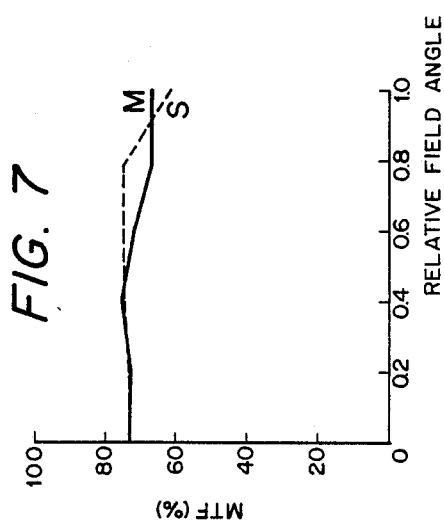
FIG. 7
FIG. 9

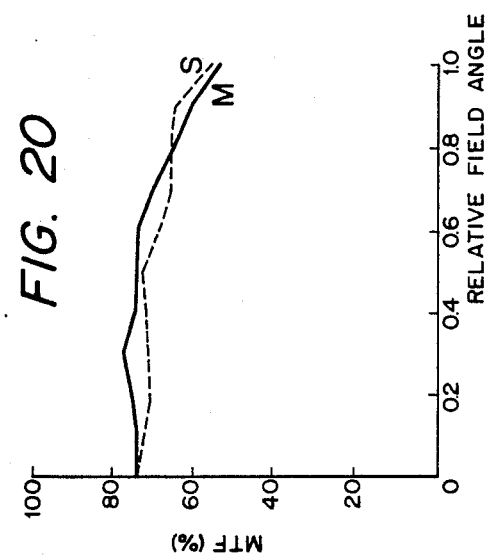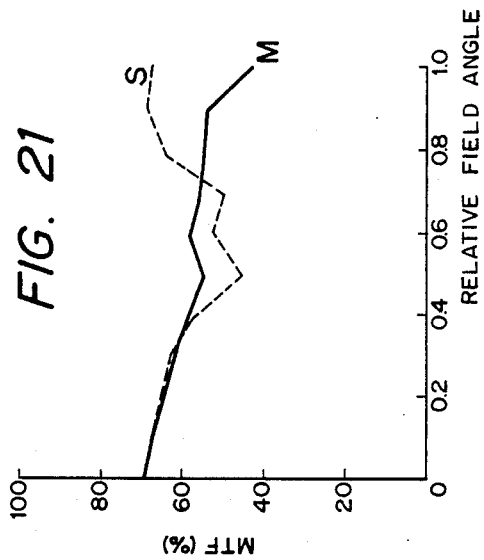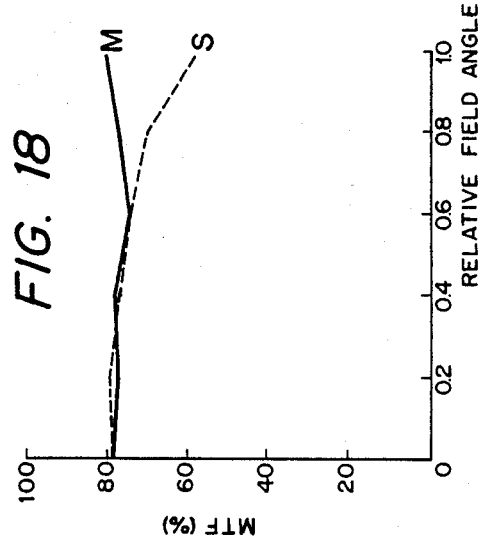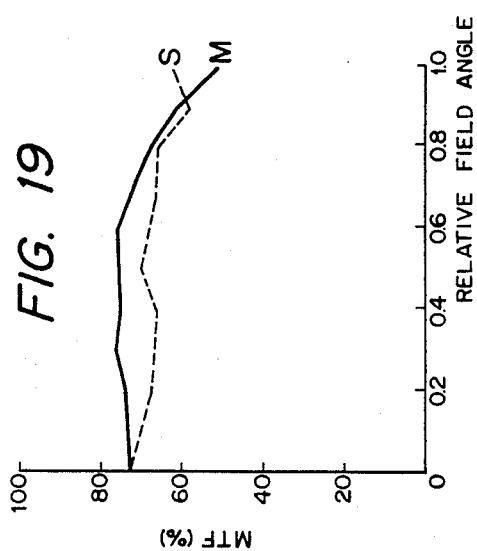

PROJECTION LENS SYSTEM

FIELD OF THE INVENTION

The present invention relates to a projection lens system suitable for a projection type television set.

BACKGROUND OF THE INVENTION

The picture quality of a projection type television set has been improved remarkably as compared with that several years ago and is now approaching that of a direct viewing type. Particularly, the development of a projection lens as a key device which determines the quality of picture is outstanding. Under such circumstances we have developed a set using a projection lens of a short projection distance capable of attaining both improvement in the quality of picture and a compact construction of the set. As U.S. Patent Applications relating to this type of projection lenses there are Series No. 715,950 (filed Mar. 25, 1985), No. 911,070 (filed Sept. 24, 1986) and No. 948,251 (filed Dec. 31, 1986).

The projection lenses disclosed in the above applications are superior in focus performance and compactness.

Also as to contrast performance, improvement has been made, as disclosed in U.S. Ser. No. 911,070, by filling the space between the surface of a cathode-ray tube and a concave lens positioned in front thereof with a medium having a refractive index close to that of the concave lens and the CRT glass to reduce reflection at the surface of the concave lens on the side of the cathode-ray tube.

However, in the working examples of the said U.S. Ser. No. 911,070 no consideration is given to reflected light at the air-side surface of the concave lens and at other lens interfaces, so the reflected light at a lens interface returning to the phosphor surface is not fully removed. To avoid this inconvenience, in the projection lens disclosed in U.S. Ser. No. 948,251, the shape of the phosphor surface is changed to make the occurrence of reflected light difficult. But a still further means is desired to attain a higher contrast performance.

Moreover, a system structure which permits easy mounting of plural lens elements is desired in order to realize a less expensive projection lens system.

SUMMARY OF THE INVENTION

It is an object of the present invention to provide a projection lens system superior in both focus performance and contrast performance.

It is another object of the present invention to provide a projection lens system which is compact and affords a high picture quality.

It is a further object of the present invention to provide a projection lens system which is compact and superior in both picture quality and mass productivity.

Among the above objects, a high contrast is attained by eliminating light rays which are reflected by the air-side surface of a concave lens, return to the phosphor surface and lower the contrast on the same surface, as well as light rays which are reflected by the inner wall surface of a lens barrel. Higher focus performance can be attained by selecting suitable lens shape, spacing and glass material in the design of lens. Further, higher mass productivity can be achieved by selecting a lens shape which permits assembling in one direction (image side or object side)

BRIEF DESCRIPTION OF THE DRAWINGS

FIGS. 6 to 22 are characteristic diagrams showing MTF characteristics of examples set forth in Tables 1 to 17;

DESCRIPTION OF THE PREFERRED EMBODIMENTS

Figure 1:
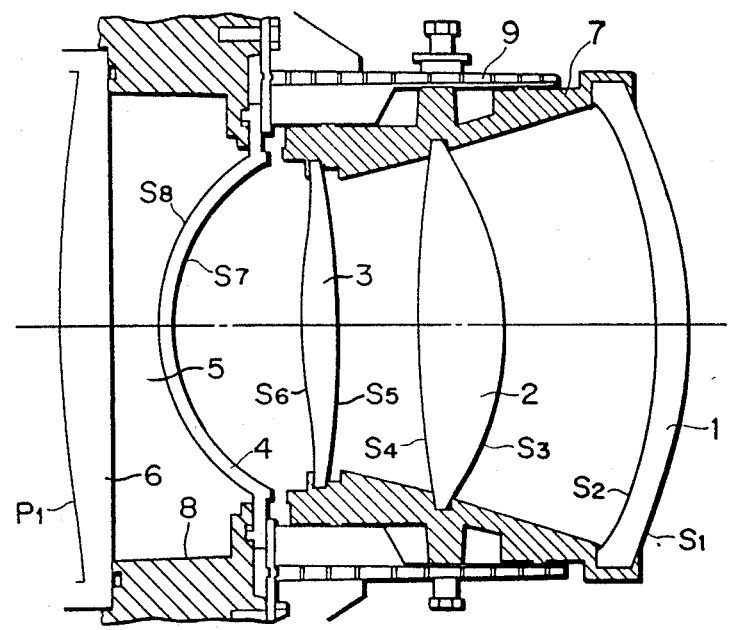
FIGS. 1 and 2 are each a longitudinal sectional view showing an embodiment of the present invention.
Figure 2:
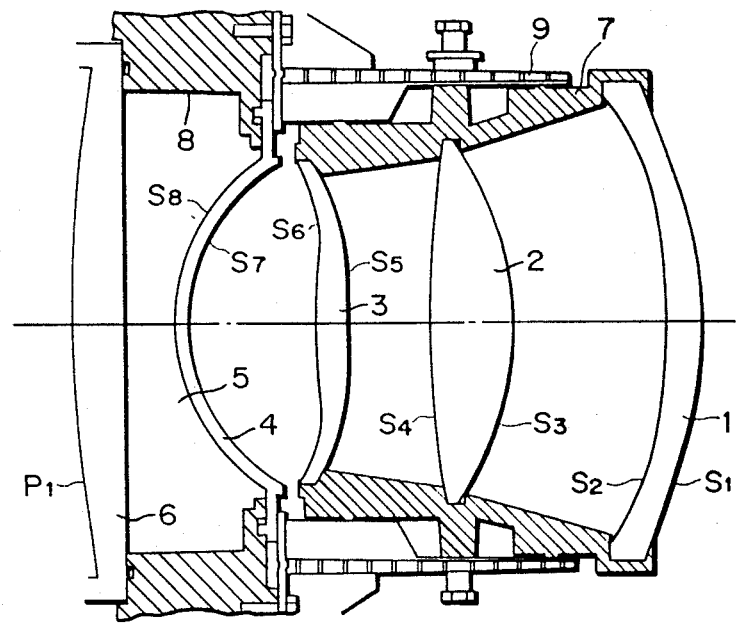

FIGS. 1 and 2 are each a sectional view showing a principal lens portion of an optical system for a projection type television set according to an embodiment of the present invention, respectively showing examples based on later-described Tables 1 and 7. In the figures, $P_1$ denotes a phosphor surface of a cathode-ray tube; numeral 6 denotes a CRT panel; numeral 5 denotes a coolant; and numerals 4, 3, 2 and 1 denote fourth, third, second and first lens groups, respectively. The optical systems shown in FIGS. 1 and 2 are constructed so that the best performance is attained when a raster of 5.4 inches on the CRT phosphor surface is enlarged to 45 inches (8.4 X) on a screen. The distance from the first lens group 1 to the screen is 778.5 mm and the field angle is 36 degrees. The first lens group 1 is in an aspherical shape to eliminate a spherical aberration based on the aperture. The second lens group 2 is a glass lens group to reduce focus drift caused by a change in temperature and has as large a power as possible.

The third lens group is of an aspherical construction to remove coma aberration of high order and astigmatism and has as small a power as possible.

The fourth lens group 4 is for correcting a field curvature and their air-side surfaces are aspherical to correct an off-axis sagittal aberration.

Moreover, the coolant thickness is set at a sufficient value to increase the foregoing $H/L_1$ ratio for attaining a high contrast and to radiate the heat from the cathode-ray tube by convection.

Further, the CRT phosphor surface $P_1$ has a curvature to correct a field curvature. Particularly, if it is made aspherical to correct a field curvature of high order, it becomes possible to effect a more exact correction.

Generally, the phosphor surface $P_1$ of the CRT panel 6 is formed by press forming and not subjected to post-processing. Therefore, no matter whether the shape to be formed is spherical or aspherical, the manufacturing method per se does not change.

At the central part of the picture plane, a spherical aberration is corrected to a satisfactory extent and there occurs only a chromatic aberration.

On the other hand, the lenses of the lens system of the invention are designed so that the power of plastic lenses is kept to a minimum, to afford thin-walled lenses with as small a difference in wall thickness as possible between the central portion and the edge portion, thereby improving the formability.

Figure 3:
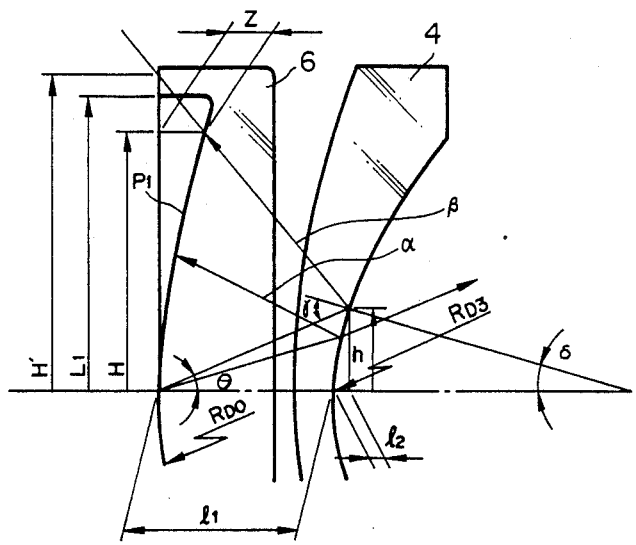
FIG. 3 is a diagram showing reflections occurring between the phosphor surface of a cathode-ray tube and a concave lens.

In order to overcome the aforementioned problem of the prior art the present inventors have determined by calculation a position of a light ray reflected totally by an air-side surface of a concave lens and returning to the phosphor surface out of light rays emitted from the center of the phosphor surface $P_1$, according to the model shown in FIG. 3. The calculation was made as follows. In the figure, $R_{D3}$ represents an average radius of curvature of the air-side surface of the concave lens; $R_{D0}$ represents an average radius of curvature of the phosphor surface $P_1$; and $l_1$ represents the distance from the phosphor surface to the air-side surface of the concave lens.

If the refractive index of the CRT face panel is $N_3$, and the angle of a ray emitted from the center of the phosphor surface $P_1$ is $\theta$, the following is a condition for this ray to be reflected totally by the air-side surface of the concave lens:

$$\gamma + \delta = sin^{-i}(1/N_1)$$

wherein $N_1$ represents a refractive index of the concave lens.

The h in the same figure is determined according to equation (1):

$$h = \frac{R_{D3}}{\tan\theta} - \sqrt{\left(\frac{R_{D3}}{\tan\theta}\right)^2 - 2 R_{D3} l_1} \quad (1)$$

Further, $$H' = h + (l_2 + l_1) \tan(\theta + 2\delta) \quad (2)$$

wherein $$l_2 = R_{D3}(1 - \cos\delta) \quad (3)$$

$$\delta = \sin^{-1}\frac{h}{R_{D3}} \quad (4)$$

Substitution of equations (1) and (3) into equation (2) gives $$H' = \frac{R_{D3}}{\tan\theta} - \sqrt{\left(\frac{R_{D3}}{\tan\theta}\right)^2 - 2 R_{D3} l_1} + (l_1 + R_{D3}(1 - \cos\delta))\tan(\theta + 2\delta) \quad (5)$$

Further, $$H = H' - Z\tan(\theta + 2\delta)$$
$$\approx H' - \frac{(H')^2}{2 R_{D0}} \quad (6)$$

If the H obtained in equation (6) is 80% or more of an effective raster region $L_1$ of the phosphor surface $P_1$, the lowering of contrast on the screen scarcely causes a practical problem. A value of H of 100% or more is nearly perfect.

In the present invention, therefore, the average radius of curvature $R_{D0}$ of the phosphor surface, average radius of curvature $R_{D3}$ of the air-side surface of the concave lens and the distance $l_1$ from the phosphor surface $P_1$ to the air-side surface of the concave lens are determined so that the H satisfies the following relationship with respect to $L_1$:

$$0.8 L_1 \leq H \quad (7)$$

Figure 4:
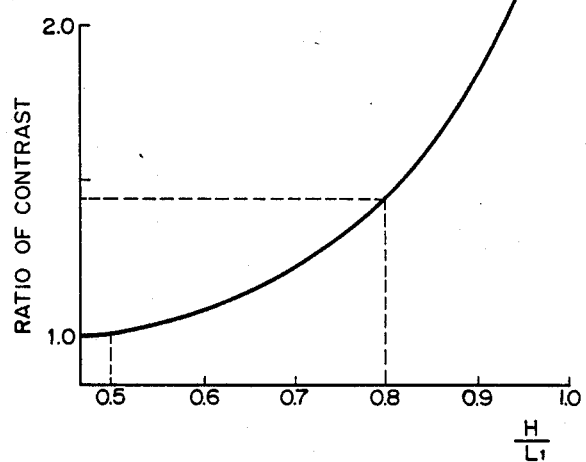
FIG. 4 is a diagram showing a relation between the phosphor surface - concave lens spacing and contrast.

FIG. 4 shows results obtained by an experiment which was conducted to check changes in contrast of a video on the screen with $l_1$ used as a variable. The axis of ordinate represents the ratio of contrast which is normalized assuming that the value of $H/L_1 = 0.5$ is 1. From this figure it is seen that the larger the $H/L_1$ ratio, the more improved the contrast, and that there is obtained a contrast of a level scarcely causing a practical problem provided the above condition (7) is satisfied.

Figure 5:
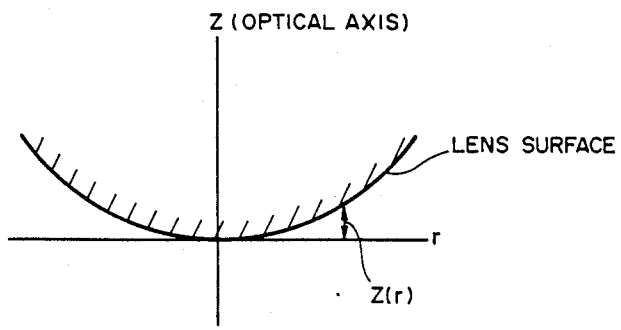
FIGS. 5 and 25 are diagrams each showing a surface shape of lens.
Figure 10:
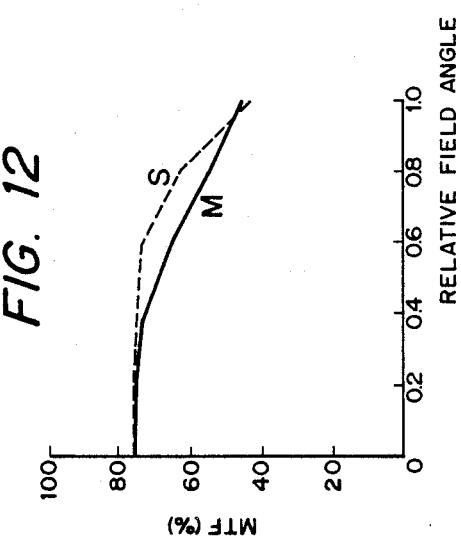
Figure 12:
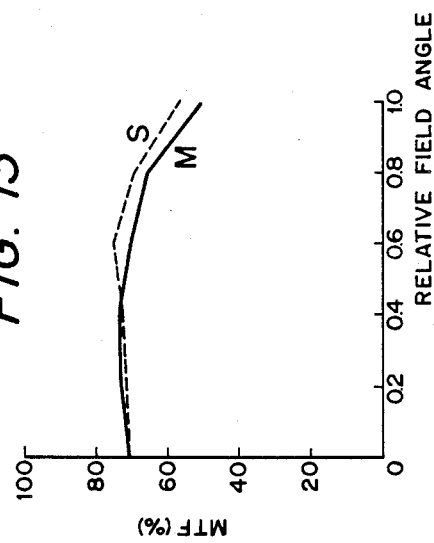
Figure 11:
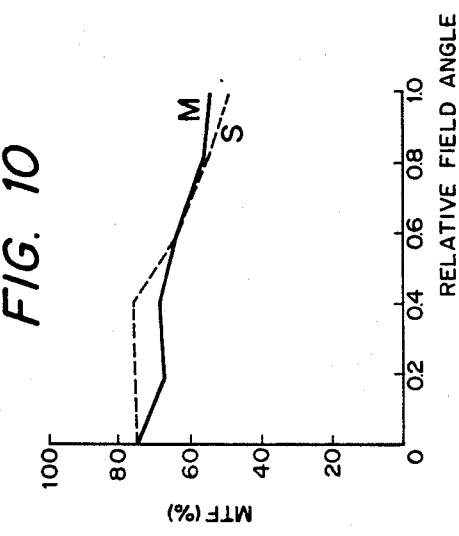
Figure 13:
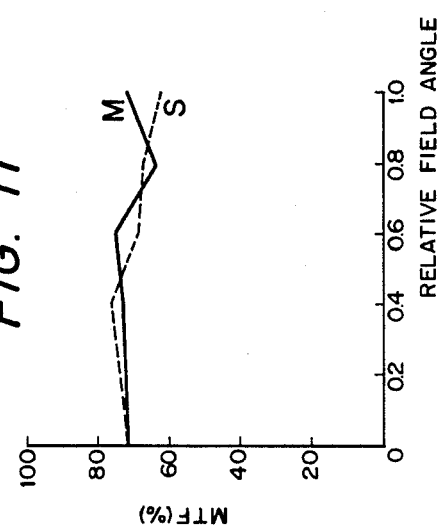
Figure 16:
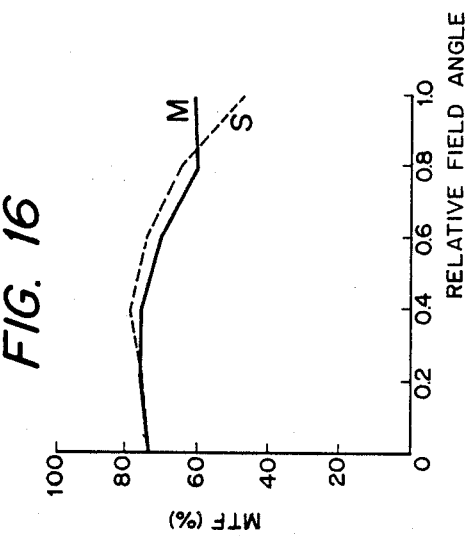
Figure 17:
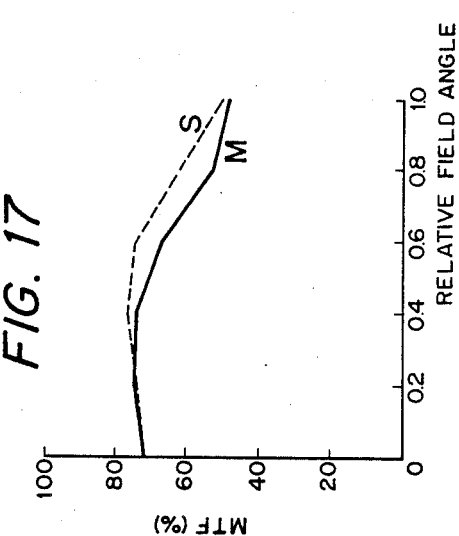
Figure 14:
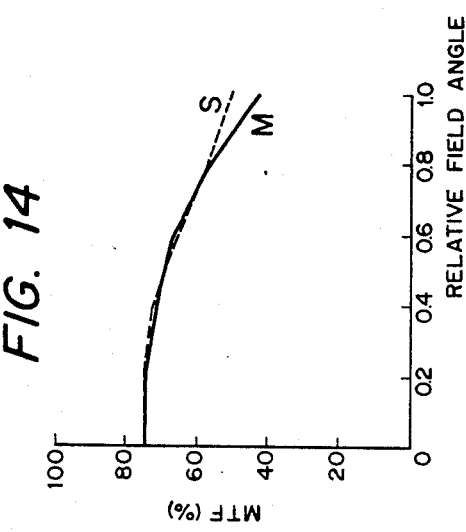
Figure 15:
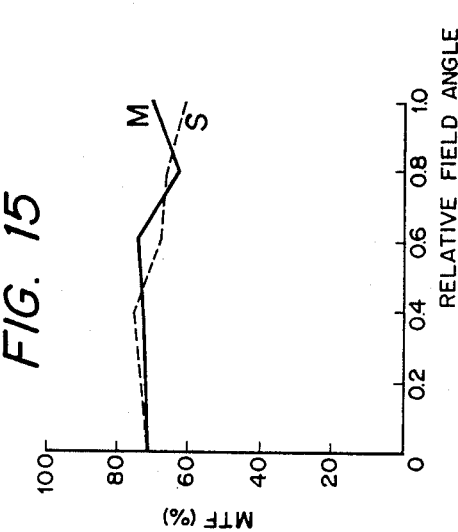
Figure 22:
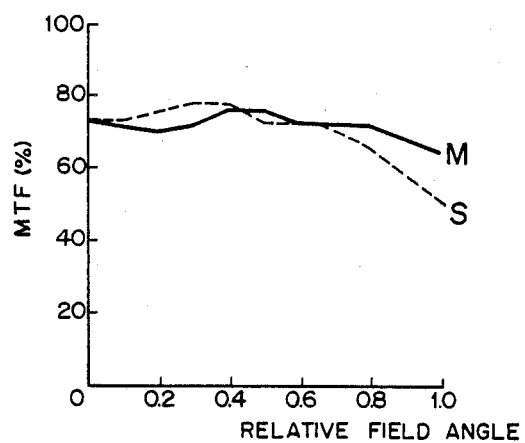

Concrete lens data capable of being adopted by this lens system are shown in Tables 1 to 17. All the lenses are not larger than 1 in F number, affording a very bright lens system. The field angle is 36 degrees. How to read Table 1 will now be explained. The data are separated into a spherical system which handles the lens region on and rear the optical axis and aspherical system which handles the outside lens region. First, it is shown therein that the screen has a radius of curvature of ∞ (that is, plane); an effective radius (clap radius) which is guaranteed optical performancewise is 580 mm; the distance (intersurface spacing) on the optical axis from the screen to a surface $S_1$ of the first lens group 1 is 778.5 mm; and the refractive index of the medium (air) filled in the space therebetween is 1.0. It is also shown that the radius of curvature of the surface $S_1$ of the first lens group 1 is −92.857 mm (the center of curvature is on the phosphor surface side; the spacing (intersurface spacing) on the optical axis between lens surfaces $S_1$ and $S_2$ is 9.0 mm; and the refractive index of the medium filled therebetween is 1.49345. Then, it is shown that the phosphor surface $P_1$ of the CRT panel 6 has a radius of curvature of 341.28 mm; the clap radius is 72.4 mm; the thickness on the optical axis of the CRT panel 6 is 13.4 mm; and refractive index is 1.53994. Further, there are shown aspherical coefficients for the surfaces $S_1$ and $S_2$ of the first lens group, surfaces $S_5$ and $S_6$ of the third lens group 3, a surface $S_7$ of the fourth lens group and the phosphor surface $P_1$. The "aspherical coefficient" is a coefficient in a surface shape expressed by the following equation:

$$Z = \frac{r^2/R_D^2}{1 + \sqrt{1 - (1 + CC) r^2/R_D^2}} + AE \cdot r^4 + AF \cdot r^6 + AG \cdot r^8 + AH \cdot r^{10}$$

wherein, as shown in FIG. 5, Z represents the height (function of r) of the lens surface when the optical axis is plotted along Z axis and the lens radius plotted along r axis; r represents a radial distance; and $R_D$ represents a radius of curvature. Thus, once coefficients of CC, AE, AF, AG and AH are given, the height of the lens surface, that is, the shape thereof, is determined according to the above equation. In Table 1, moreover, it is shown that a surface $S_8$ of the first lens group 1 and the fourth lens group 4 is zero in all aspherical coefficients, proving to be spherical. The above are how to read the data shown in Table 1. Tables 2 to 17 show concrete examples of other lens data. In the objection lens system of the present invention, as set forth above, the distance from the phosphor surface to the air-side surface of the concave lens (the fourth lens group), an average radius of curvature of the air-side surface of the concave lens and that of the phosphor surface are optimized, whereby not only an enlarged image of a high contrast is obtained on the screen but also the focus performance is improved.

Figure 23:
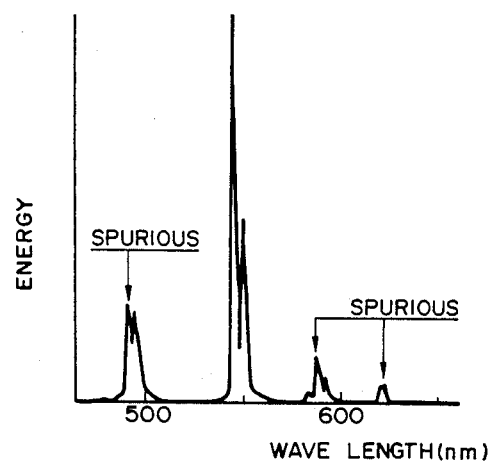
FIG. 23 is a characteristic diagram showing an emission spectrum distribution of a phosphor.

Referring now to FIGS. 6 to 22, there are shown evaluation results of focus characteristics using MTF (Modulation Transfer Function), obtained when a 5.4 inch image on the phosphor surface is enlarged onto a screen through the projection lens system of the present invention. The phosphor emission spectrum shown in FIG. 23 was used. The characteristic diagrams of FIGS. 6 to 22 correspond to the Examples of Tables 1 to 17, respectively. The illustrations are of the case where 300 TV pc. is taken as a frequency of a black and white stripe signal on the screen. It is seen that FIGS. 6 to 22 show good MTF characteristics.

With respect to the Examples shown in Tables 1 to 17, if the focal length of the entire system is $f_0$, the focal distances of the first, second, third and fourth lens groups are $f_1$, $f_2$, $f_3$ and $f_4$, respectively, there exist the relationships shown in Table 18, namely:

$0.06 < f_0/f_1 < 0.17$
$0.82 < f_0/f_2 < 0.87$
$0.31 < f_0/f_3 < 0.43$
$-0.75 < f_0/f_4 < -0.54$

As to the ratio of the spacing $l_{67}$ between the third lens group 3 and the fourth 4 to the spacing $l_{45}$ between the third lens group 3 and the second 2, there exists the following relationship as shown in Table 18:

$1.29 < l_{67}/l_{45} < 1.81$

In order to increase the brightness ratio of the image field edge while maintaining the focus performance, it is necessary to satisfy the following condition:

$1.29 < l_{67}/l_{45}$

As this ratio increases, the quantity of light in the middle region tends to decrease, so it is desirable to satisfy the following condition:

$l_{67}/l_{45} < 1.81$

Figure 24:
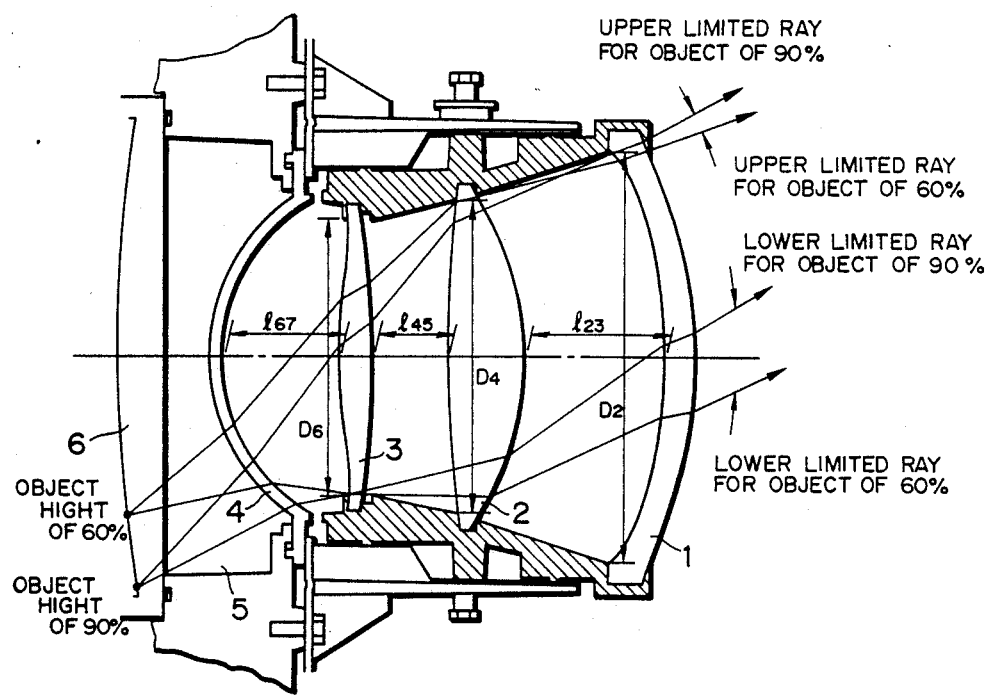
FIGS. 24 and 28 are diagrams showing the results of having traced light rays emitted from the phosphor surface of a projection lens.

Under this condition, upper and lower limited rays of rays emitted from an object point other than the optical axis are allowed to pass through the lens system in a well-balanced state to thereby realize a good aberration correction. Another means for increasing the brightness ratio of the image field edge is to widen the clap diameter of the lenses which define the upper and lower limited rays. In the lens system of the present invention, as shown in FIG. 24, the lower limited ray is defined by a fourth lens group 4-side surface diameter $D_6$ of the third lens group 3 and the upper limited ray is defined by a second lens group 2-side surface diameter $D_2$ of the first lens group 1. On the other hand, $F_{N0}$ of lens is determined by a third lens group 3-side diameter $D_4$ of the second lens group 2, so in order to obtain a good brightness ratio of the image field edge it is necessary to select appropriate values of lens diameter ratios $D_2/D_4$ and $D_4/D_6$. In the lens system of the present invention, there exists the following relationship on the lower limited ray as shown in Table 18:

$1.15 < D_4/D_6 < 1.26$

On the other hand, as to the upper limited ray, there exists the following relationship as in Table 18:

$1.19 < D_2/D_4 < 1.30$

Where the $D_2/D_4$ ratio is smaller than 1.19, the quantity of light at the edge portion of the screen is deficient, while when it exceeds 1.30, there occurs a coma aberration of high order and so the focus performance is deteriorated. Where the edge brightness is not required so much, only the following limitation may be adopted:

$D_2/D_4 < 1.30$

It is known that a sufficient edge brightness can be obtained by determining the clap diameter of each constituent lens of the projection lens system so that a video light emitted from an object point off the optical axis can pass sufficiently therethrough. However, it is extremely difficult to make aberration correction for rays which pass through the outer peripheral portion of each unit lens. Usually the clap diameter is determined on the basis of a balance between focus and the edge brightness ratio. In the projection lens system embodying the present invention, an upper limited ray passing through the projection lens among video rays from the aforementioned object point located off the optical axis is defined by the clap diameter $D_2$ of the second lens group 2-side surface of the first lens group 1. As to the ratio of this $D_2$ to the overall lens length $L_0$, it is seen from Table 18 that there exists the following relationship:

$0.6 < D_2/L_0$

Further, the larger the spacing $l_{23}$ between the first lens group 1 and the second 2, the smaller the quantity of passing light. Therefore, in order to obtain a good value of the edge brightness ratio, it is necessary to select an appropriate value of $l_{23}$. As to the ratio of the spacing $l_{23}$ to the focal length $f_0$ of the entire system, it is seen from Table 18 that there exists the following relationship:

$0.43 < l_{23}/f_0 < 0.49$

If importance is attached to the edge brightness ratio, the following condition will do:

$l_{23}/f_0 < 0.49$

On the other hand, when viewed from the aspect of aberration correction, the following condition is desirable:

$0.43 < l_{23}/f_0$

Satisfying the above relationships, the projection lens system embodying the present invention exhibits good values of edge brightness not smaller than 30% (at an object height of 90% for the outermost portion of the screen).

The shape of the lens surface will now be explained. The following can be said with respect to the aspherical shape of both surfaces $S_1$ and $S_2$ of the first lens group 1 and both surfaces $S_5$ and $S_6$ of the third lens group 3.

Figure 25:
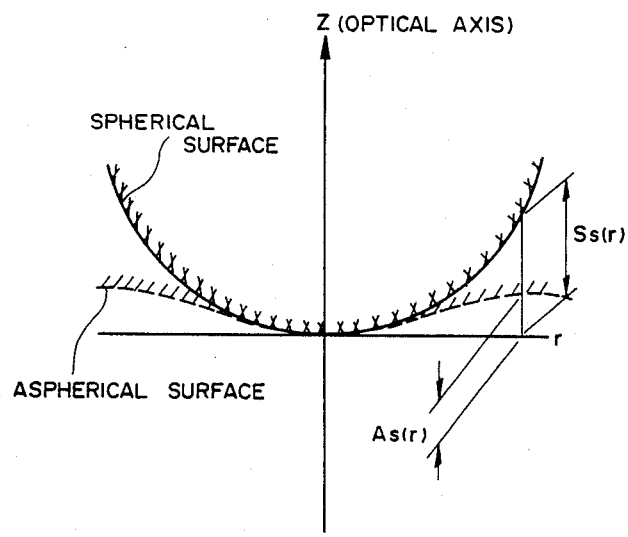

Referring to FIG. 25, there is illustrated an aspherical lens shape. When the optical axis direction is plotted along Z axis and the radial direction of the lens plotted along r axis, if the lens surface height of the spherical system or $R_D$ alone is Is(r) and the case where the aspherical coefficients of CC, AE, AF, AG and AH are substituted into equation (1) is As(r), it is seen from Table 20 that if the clap radius is substituted into r, the As(r) to Is(r) ratio of the fourth lens group 4-side surface of the third lens group 3 is in the following relationship:

$$-1.70 < As/Is < 0.83$$

It is also seen that the ratio of As to Is of the second lens group 2-side surface of the third lens group 3 is in the following relationship:

$$0.44 < As/Ss < 4.12$$

Likewise, it is understood from Table 19 that the As to Ss ratio of the screen-side surface of the first lens group 1 is in the following relationship:

$$0.64 < As/Ss < 0.87$$

Further, it is understood that there exists the following relationship with respect to the As to Ss ratio of the second lens group 2-side surface of the first lens group 1:

$$1.04 < As/Ss < 1.54$$

As to the shape of the phosphor surface, the data of Tables 6 and 11 are of a spherical shape, while the other data are of a surface shape having a radius of curvature which becomes larger from the central portion toward the peripheral portion.

Figure 26:
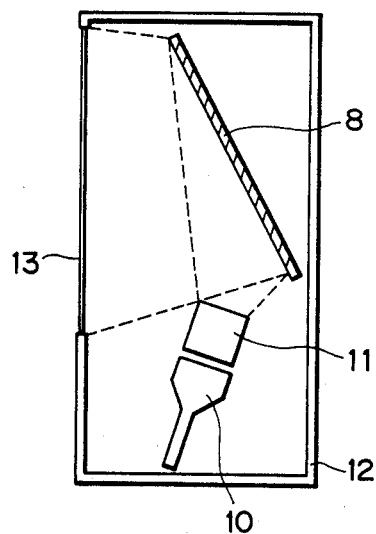
FIGS. 26 and 27 are each a longitudinal sectional view of a projection type television set using a projection lens.
Figure 27:
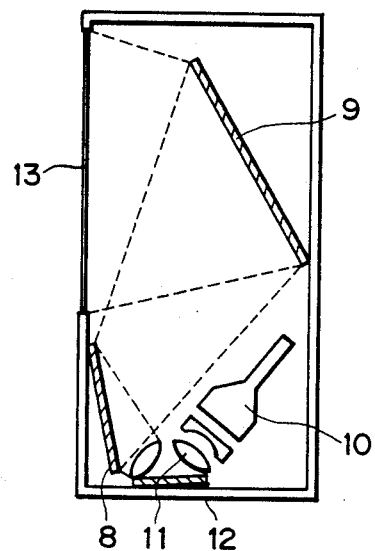

Referring to FIGS. 26 and 27, there are illustrated common arrangements of optical components of projection type television sets, which optical components are turn-around mirrors 8, 9, a projection lens 11 and a cathode-ray tube 10. Where the screen-projection lens spacing (projection distance) is long, two turn-around mirrors are disposed to attain a compact construction of the set, as shown in FIG. 27.

In the projection lens system of the present invention, the projection distance at 45 inch projection is as short as 778.5 mm, so it is possible to attain a compact construction of the set using a single turn-around mirror as shown in FIG. 26.

Figure 28:
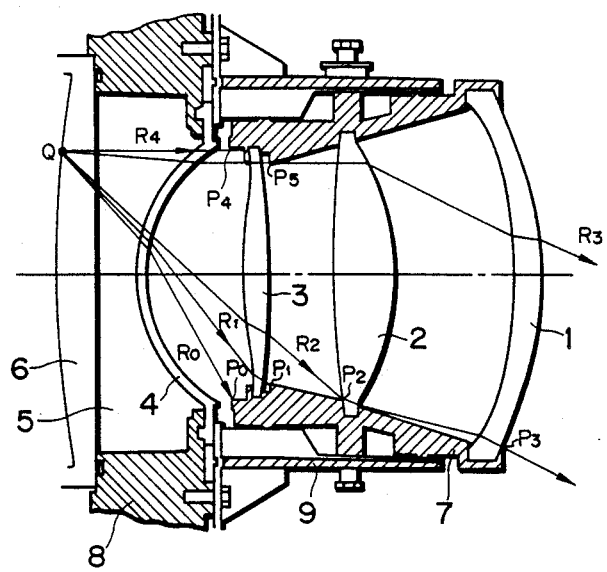

Features of the present invention have been described above on the basis of the lens data thereof. Another embodiment of the invention for attaining a high contrast will now be described with reference to FIG. 28 which is a sectional view of the lens system of the invention as mounted in a lens barrel. Out of rays emitted from an object point Q located off the optical axis, rays which are incident on an inner barrel 7 are in the range of $R_0$ to $R_4$, of which rays in the ranges of $R_0$ to $R_1$ and $R_3$ to $R_4$ are reflected in the ranges of $P_0$ to $P_1$ and $P_4$ to $P_5$, respectively, of the barrel, but are shut off by the clap of the third lens group 3. After being reflected by the barrel, those rays do not become unnecessary rays. Further, rays in the range of $R_1$ to $R_2$ are reflected at $P_1$ and $P_2$ of the barrel, but due to inclination formed on the inner surface of the barrel, the reflected rays are refracted at the second and first lens groups 2 and 1 and then travel in a direction other than the screen, so do not become unnecessary rays at the image point. Further, after refracted by the second lens group, the ray $R_2$ is refracted by the first lens group without being incident on the inner wall surface of the barrel and is focused on the image point as a normal ray. Consequently, the lens system of the present invention does not produce unnecessary rays, permitting the realization of a high contrast. As noted above, the inner wall surface of the lens barrel in the present invention is inclined with respect to the axis of the barrel so that the inside diameter of the barrel is larger gradually from the third lens group toward the first lens group. In conformity with such inside diameter of the barrel, the constituent lenses are also gradually larger in diameter in the order of the third, the second and the first lens group. Therefore, unnecessary rays are difficult to be produced, thus preventing the lowering of contrast.

The following description is now provided about the lens barrel and lens assembling method in the present invention with reference to FIGS. 29 to 36.

Figure 29:
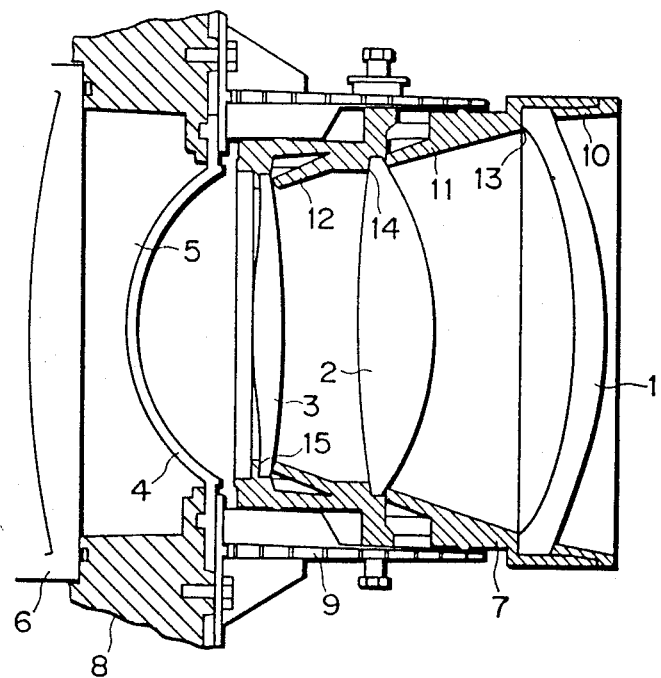
FIGS. 29 to 36 are each a longitudinal sectional view showing a lens barrel.
Figure 30:
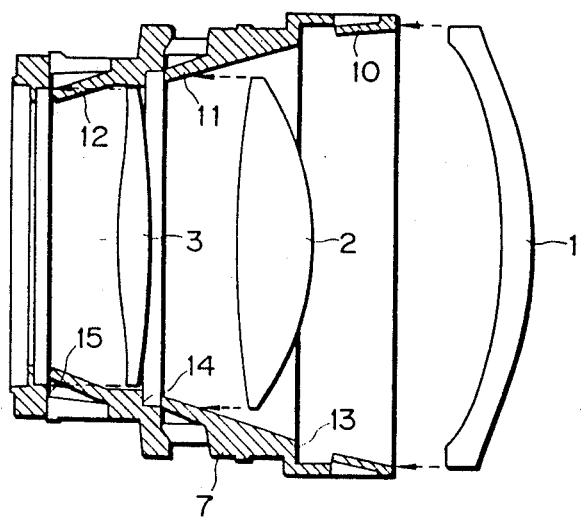

FIG. 29 illustrates lenses as mounted in a lens barrel embodying the invention and FIG. 30 illustrates in what order the lenses are mounted in the barrel. Lens retaining pawls 10, 11 and 12 are formed, projecting from the inner wall surface of a lens barrel 7 made of a resin. The pawls 10, 11 and 12 are each inclined toward the axis of the barrel. Further, the inner wall surface of the resinous lens barrel 7 is formed with lens receiving faces 13, 14 and 15. The unit lenses (hereinafter referred to as the "lens elements") which constitute the lens groups are held grippingly by the thus-formed lens retaining pawls 10, 11 and 12 and lens receiving faces 13, 14 and 15. The lens receiving faces also serve as claps of the lens elements. In assembling the lenses, as shown in FIG. 30, the third lens group 3, the second 2 and the first 1 are inserted in this order into the lens barrel from an image field-side opening of the barrel. As the lens elements are inserted, the lens retaining pawls 10, 11 and 12 are spread out, and when the lens elements reach the lens receiving faces 13, 14 and 15, those lens retaining pawls substantially revert to the original state. At the same time, the front ends of the lens retaining pawls 10, 11 and 12 press the other faces of the lens elements, whereby the lens elements can be held grippingly. Such lens barrel of the present invention permits the lenses to be mounted from one direction (image field side) and thus it is superior also in point of mass productivity. Moreover, even in comparison with the conventional bonding using an adhesive, the assembling time can be greatly reduced, thus permitting reduction of the manufacturing cost.

Figure 31:
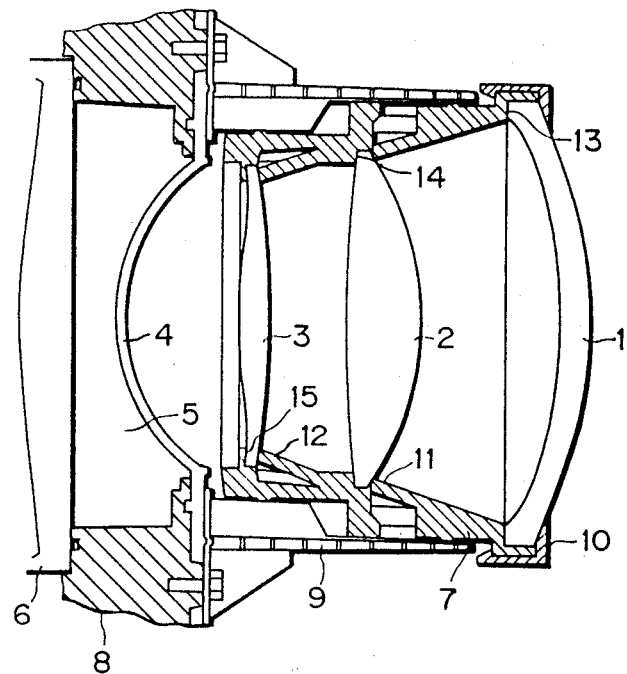
Figure 32:
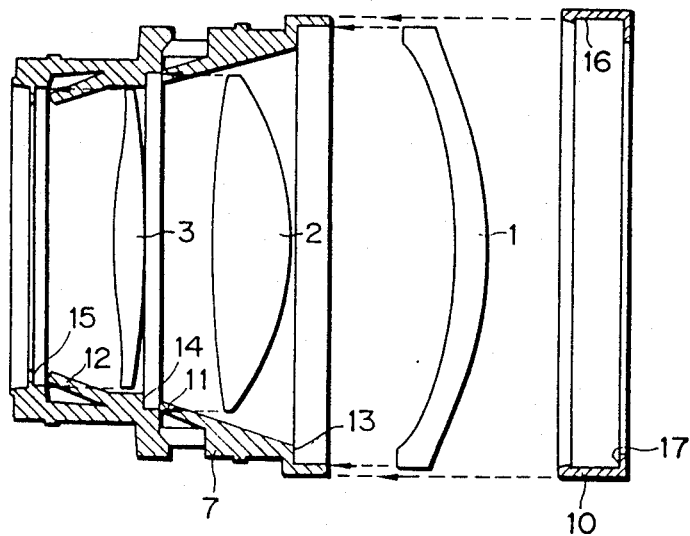

FIG. 31 illustrates lenses as mounted in a lens barrel according to another embodiment of the present invention and FIG. 32 illustrates in what order the lenses are mounted. The lenses are mounted in the order of the third, the second and the first lens group. The third lens group 3 and the second 2 are held grippingly by lens retaining pawls 11, 12 and lens receiving faces 14, 15 in the same manner as in the previous embodiment. The first lens group 1 presses against a lens receiving face 13 and a lens retaining member 10 is pushed against an inner barrel 7. At this time, the lens retaining member is spread out, but a return 16 thereof engages a stepped portion of the inner barrel 7, thus allowing the retaining member to revert its original state. In this way the first lens group 1 is held grippingly by lens receiving faces 13 and 17 of the inner barrel 7 and the lens retaining member 10, respectively. Also in this embodiment the lenses can be mounted from one direction (the image field side) and bonding is not required.

Figure 33:
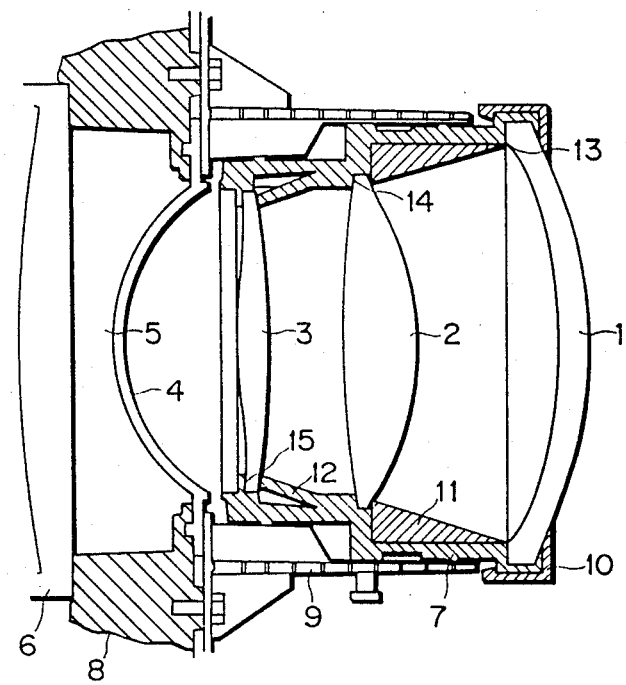
Figure 34:
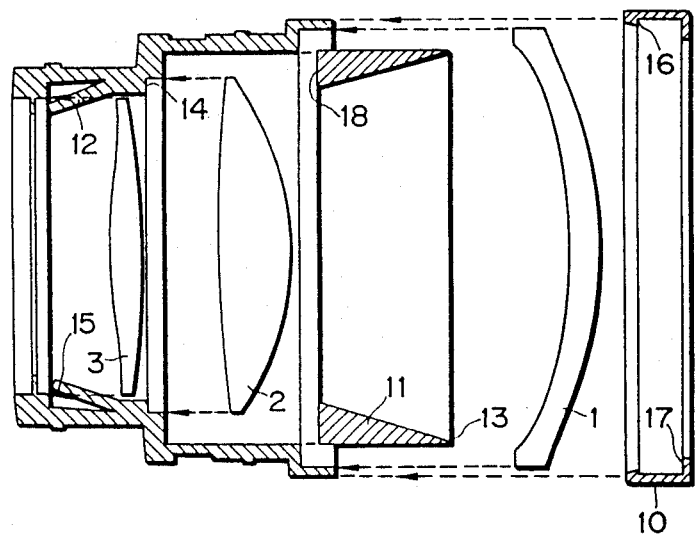

FIG. 33 illustrates lenses as mounted in a lens barrel according to a further embodiment of the invention and FIG. 34 illustrates in what order the lenses are mounted. The lenses are mounted in the order of the third, then the second lens group, then a spacing ring 11 and the first lens group 1. The third lens group 3 is held grippingly by a lens retaining pawl 12 and a lens receiving face 15. Then, the second lens group 2 is pushed against a lens receiving face 14 and the spacing ring 11 also pressed to hold the second lens group between both lens receiving faces. Lastly, the first lens group 1 is pushed against the other face 13 of the spacing ring 11 and is held between a lens receiving face 17 of the lens retaining member 10 and the lens receiving face 13 of the spacing ring 11. Also in this embodiment the lenses can be mounted from one direction (the image field side) and bonding is not required.

Figure 35:
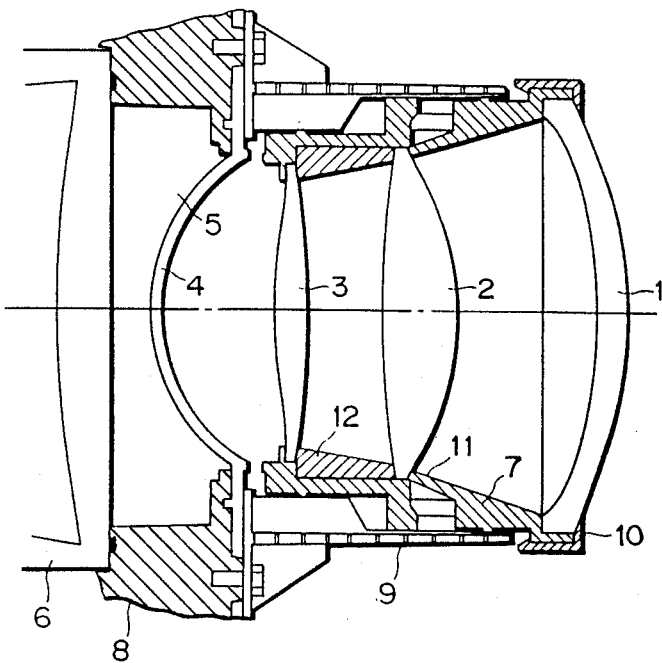
Figure 36:
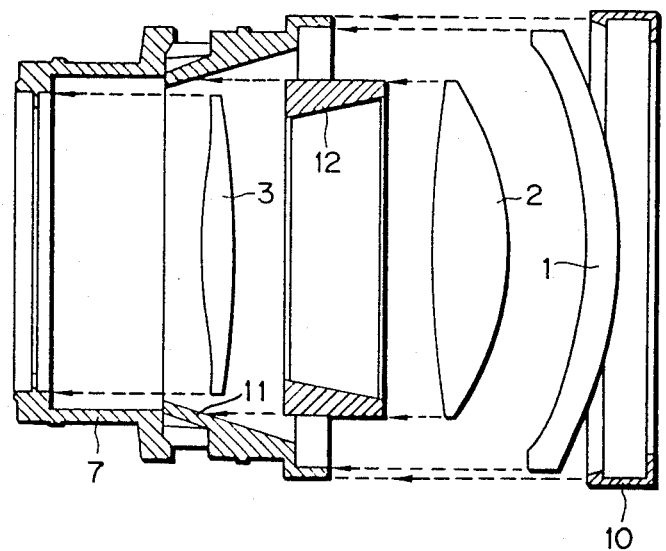

FIG. 35 illustrates lenses as mounted in a lens barrel according to a still further embodiment of the invention, in which a spacing ring 12 is provided between the third lens group 3 and the second 2. The lens mounting order is as shown in FIG. 36. That is, the third lens group 3, the spacing ring 12, the second lens group 2 and the first 1 are inserted in this order into the lens barrel from an image field-side opening of the lens barrel and fixed by a lens retaining member 10. Also in this embodiment the lenses can be mounted from one direction (the image field side) and bonding is not required.

Figure 37:
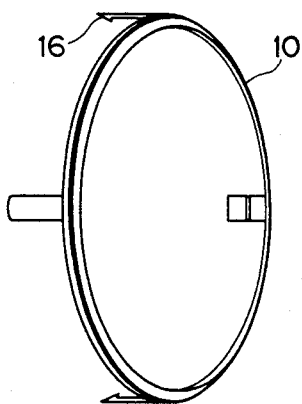
FIG. 37 is a perspective view showing a retaining member for a lens barrel.

FIG. 37 illustrates the lens retaining member 10 as seen from an oblique angle.

TABLE 1

| | Radius of curvature $R_D$ | Clap radius | Intersurface spacing | Refractive index |
|---|---|---|---|---|
| Spherical system | | | | |
| Screen | ∞ | 580.0 | | |
| First lens | | | 778.5 | 1.0 |
| $S_1$ | −92.857 | 58.0 | | |
| | | | 9.0 | 1.49345 |
| $S_2$ | −134.27 | 53.75 | | |
| Second lens | | | 39.0 | 1.0 |
| $S_3$ | −76.78 | 43.5 | | |
| | | | 21.0 | 1.59149 |
| $S_4$ | 309.25 | 41.6 | | |
| Third lens | | | 21.5 | 1.0 |
| $S_5$ | −413.78 | 36.0 | | |
| | | | 8.0 | 1.49345 |
| $S_6$ | 165.41 | 36.0 | | |
| Fourth lens | | | 32.546 | 1.0 |
| $S_7$ | 50.924 | 40.3 | | |
| | | | 3.4048 | 1.49345 |
| $S_8$ | 50.774 | 41.9 | | |
| | | | 12.0 | 1.44473 |
| Transparent medium Glass | ∞ | 72.4 | | |
| | | | 13.4 | 1.53994 |
| Phosphor surface $P_1$ | 341.28 | 72.4 | | |

| | CC | AE | AF | AG | AH |
|---|---|---|---|---|---|
| Aspherical system | | | | | |
| First lens | | | | | |
| $S_1$ | −1.1641588 | $-1.4528285 \times 10^{-7}$ | $3.1447001 \times 10^{-10}$ | $-5.4649631 \times 10^{-14}$ | $-5.8785782 \times 10^{-19}$ |
| $S_2$ | 4.3103714 | $-8.7222134 \times 10^{-8}$ | $2.4314661 \times 10^{-10}$ | $-3.7769396 \times 10^{-14}$ | $-3.1237086 \times 10^{-18}$ |
| Third lens | | | | | |
| $S_5$ | −27.918533 | $1.5742370 \times 10^{-7}$ | $-3.5476133 \times 10^{-10}$ | $-2.5419564 \times 10^{-13}$ | $1.1244196 \times 10^{-16}$ |
| $S_6$ | 12.823207 | $-8.5459834 \times 10^{-7}$ | $-2.9324099 \times 10^{-10}$ | $-5.6273503 \times 10^{-13}$ | $1.5608238 \times 10^{-16}$ |
| Fourth lens | | | | | |
| $S_7$ | 0.39626831 | $7.2942424 \times 10^{-7}$ | $-1.0023198 \times 10^{-9}$ | $3.4842929 \times 10^{-13}$ | $-9.8013676 \times 10^{-17}$ |
| Phosphor surface $P_1$ | 4.5813494 | $2.3355796 \times 10^{-7}$ | $-1.182420 \times 10^{-10}$ | $1.4486896 \times 10^{-14}$ | $-5.5873481 \times 10^{-19}$ |

$$Z = \frac{r^2/R_D}{1 + \sqrt{1 - (1 + CC) r^2/R_D^2}} + AE \cdot r^4 + AF \cdot r^6 + AG \cdot r^8 + AH \cdot r^{10}$$

TABLE 2

| | Radius of curvature $R_D$ | Clap radius | Intersurface spacing | Refractive index |
|---|---|---|---|---|
| Spherical system | | | | |
| Screen | ∞ | 580.0 | | |
| First lens | | | 778.5 | 1.0 |
| $S_1$ | −111.81 | 58.0 | | |
| | | | 9.0 | 1.49345 |
| $S_2$ | −131.29 | 53.75 | | |
| Second lens | | | 39.0 | 1.0 |
| $S_3$ | −80.329 | 43.5 | | |
| | | | 21.0 | 1.59149 |
| $S_4$ | 272.28 | 41.6 | | |
| Third lens | | | 21.5 | 1.0 |

TABLE 2-continued

| | | | | | |
|---|---|---|---|---|---|
| S$_5$ | −345.85 | 36.0 | | | |
| | | | 8.0 | | 1.49345 |
| S$_6$ | 154.50 | 36.0 | | | |
| Fourth lens | | | 38.841 | | 1.0 |
| S$_7$ | 53.064 | 40.3 | | | |
| | | | 3.4048 | | 1.49345 |
| S$_8$ | 50.774 | 41.9 | | | |
| | | | 12.0 | | 1.44473 |
| Transparent medium | ∞ | 72.4 | | | |
| Glass | | | 13.4 | | 1.53994 |
| Phosphor surface P$_1$ | 341.28 | 72.4 | | | |

| | CC | AE | AF | AG | AH |
|---|---|---|---|---|---|
| Aspherical system | | | | | |
| First lens | | | | | |
| S$_1$ | −1.6666957 | $1.8010327 \times 10^{-8}$ | $1.9671583 \times 10^{-10}$ | $-5.7187256 \times 10^{-14}$ | $5.0844494 \times 10^{-18}$ |
| S$_2$ | 4.0419318 | $-1.0015520 \times 10^{-7}$ | $1.9034329 \times 10^{-10}$ | $-7.1216802 \times 10^{-14}$ | $4.7311643 \times 10^{-18}$ |
| Third lens | | | | | |
| S$_5$ | −9.8643995 | $3.7696315 \times 10^{-8}$ | $1.9798463 \times 10^{-11}$ | $-2.4522837 \times 10^{-13}$ | $1.0116125 \times 10^{-16}$ |
| S$_6$ | 10.447633 | $-7.1304003 \times 10^{-7}$ | $-1.0926096 \times 10^{-10}$ | $-3.8151919 \times 10^{-13}$ | $1.0109782 \times 10^{-16}$ |
| Fourth lens | | | | | |
| S$_7$ | 0.32026635 | $1.1568473 \times 10^{-6}$ | $-1.0634341 \times 10^{-9}$ | $4.9577460 \times 10^{-13}$ | $-1.0400179 \times 10^{-16}$ |
| Phosphor surface P$_1$ | 4.5813494 | $2.3355796 \times 10^{-7}$ | $-1.182420 \times 10^{-10}$ | $1.4486896 \times 10^{-14}$ | $-5.5873481 \times 10^{-19}$ |

$$Z = \frac{r^2/R_D}{1 + \sqrt{1 - (1 + CC) r^2/R_D^2}} + AE \cdot r^4 + AF \cdot r^6 + AG \cdot r^8 + AH \cdot r^{10}$$

TABLE 3

| | Radius of curvature R$_D$ | Clap radius | Intersurface spacing | Refractive index |
|---|---|---|---|---|
| Spherical system | | | | |
| Screen | ∞ | 580.0 | | |
| First lens | | | 778.5 | 1.0 |
| S$_1$ | −98.574 | 58.0 | | |
| | | | 9.0 | 1.49345 |
| S$_2$ | −121.64 | 53.75 | | |
| Second lens | | | 39.0 | 1.0 |
| S$_3$ | −76.531 | 43.5 | | |
| | | | 21.0 | 1.59149 |
| S$_4$ | 291.49 | 41.6 | | |
| Third lens | | | 25.058 | 1.0 |
| S$_5$ | −228.21 | 36.0 | | |
| | | | 8.0 | 1.49345 |
| S$_6$ | 187.09 | 36.0 | | |
| Fourth lens | | | 32.546 | 1.0 |
| S$_7$ | 48.667 | 40.3 | | |
| | | | 3.4048 | 1.49345 |
| S$_8$ | 50.774 | 41.9 | | |
| | | | 12.0 | 1.44473 |
| Transparent medium | ∞ | 72.4 | | |
| Glass | | | 13.4 | 1.53994 |
| Phosphor surface P$_1$ | 341.28 | 72.4 | | |

| | CC | AE | AF | AG | AH |
|---|---|---|---|---|---|
| Aspherical system | | | | | |
| First lens | | | | | |
| S$_1$ | −1.826397 | $-1.2116779 \times 10^{-7}$ | $2.2859866 \times 10^{-10}$ | $-5.9148361 \times 10^{-14}$ | $3.4170540 \times 10^{-18}$ |
| S$_2$ | 3.4481699 | $-8.5178163 \times 10^{-8}$ | $2.0742573 \times 10^{-10}$ | $-6.3678607 \times 10^{-14}$ | $2.4008875 \times 10^{-18}$ |
| Third lens | | | | | |
| S$_5$ | 9.7609630 | $4.7641278 \times 10^{-8}$ | $-1.681250 \times 10^{-10}$ | $-2.018923 \times 10^{-13}$ | $2.1127269 \times 10^{-16}$ |
| S$_6$ | 13.833271 | $-9.5960215 \times 10^{-7}$ | $-2.3150817 \times 10^{-10}$ | $-3.8866468 \times 10^{-13}$ | $2.369616 \times 10^{-16}$ |
| Fourth lens | | | | | |
| S$_7$ | $9.081227 \times 10^{-6}$ | $6.0432416 \times 10^{-7}$ | $-1.0243267 \times 10^{-9}$ | $2.9441718 \times 10^{-13}$ | $-4.0108455 \times 10^{-18}$ |
| Phosphor surface P$_1$ | 4.5813494 | $2.3355796 \times 10^{-7}$ | $-1.182420 \times 10^{-10}$ | $1.4486896 \times 10^{-14}$ | $-5.5873481 \times 10^{-19}$ |

$$Z = \frac{r^2/R_D}{1 + \sqrt{1 - (1 + CC) r^2/R_D^2}} + AE \cdot r^4 + AF \cdot r^6 + AG \cdot r^8 + AH \cdot r^{10}$$

TABLE 4

| | Radius of curvature R$_D$ | Clap radius | Intersurface spacing | Refractive index |
|---|---|---|---|---|
| Spherical system | | | | |
| Screen | ∞ | 580.0 | | |
| First lens | | | 778.5 | 1.0 |
| S$_1$ | −93.458 | 58.0 | | |

TABLE 4-continued

|  | Radius of curvature $R_D$ | Clap radius | Intersurface spacing | Refractive index |
|---|---|---|---|---|
|  |  |  | 9.0 | 1.49345 |
| $S_2$ | −128.99 | 53.75 |  |  |
| Second lens |  |  | 43.281 | 1.0 |
| $S_3$ | −73.559 | 43.5 |  |  |
|  |  |  | 21.0 | 1.59149 |
| $S_4$ | 368.85 | 41.6 |  |  |
| Third lens |  |  | 21.5 | 1.0 |
| $S_5$ | −273.39 | 36.0 |  |  |
|  |  |  | 8.0 | 1.49345 |
| $S_6$ | 194.98 | 36.0 |  |  |
| Fourth lens |  |  | 32.546 | 1.0 |
| $S_7$ | 48.557 | 40.3 |  |  |
|  |  |  | 3.4048 | 1.49345 |
| $S_8$ | 50.774 | 41.9 |  |  |
|  |  |  | 12.0 | 1.44473 |
| Transparent medium | 28 | 72.4 |  |  |
| Glass |  |  | 13.4 | 1.53994 |
| Phosphor surface $P_1$ | 341.28 | 72.4 |  |  |

|  | CC | AE | AF | AG | AH |
|---|---|---|---|---|---|
| Aspherical system |  |  |  |  |  |
| First lens |  |  |  |  |  |
| $S_1$ | −1.2664192 | −1.7901234 × 10$^{-7}$ | 2.6648247 × 10$^{-10}$ | −5.3309023 × 10$^{-14}$ | 8.0239526 × 10$^{-19}$ |
| $S_2$ | 3.8892445 | −1.0617908 × 10$^{-7}$ | 2.3244952 × 10$^{-10}$ | −5.0928712 × 10$^{-14}$ | 4.8259182 × 10$^{-19}$ |
| Third lens |  |  |  |  |  |
| $S_5$ | −3.7900217 | 7.8641640 × 10$^{-8}$ | −6.3702982 × 10$^{-11}$ | −1.9121684 × 10$^{-13}$ | 1.2365534 × 10$^{-16}$ |
| $S_6$ | 12.871346 | −8.2445350 × 10$^{-7}$ | −7.3619592 × 10$^{-11}$ | −4.3373835 × 10$^{-13}$ | 1.7469113 × 10$^{-18}$ |
| Fourth lens |  |  |  |  |  |
| $S_7$ | 0.22549291 | 2.9588538 × 10$^{-7}$ | −1.1933088 × 10$^{-9}$ | 6.2331525 × 10$^{-13}$ | −1.8522849 × 10$^{-16}$ |
| Phosphor surface $P_1$ | 4.5813494 | 2.3355796 × 10$^{-7}$ | −1.182420 × 10$^{-10}$ | 1.4486896 × 10$^{-14}$ | −5.5873481 × 10$^{-19}$ |

$$Z = \frac{r^2/R_D}{1 + \sqrt{1 - (1 + CC) r^2/R_D^2}} + AE \cdot r^4 + AF \cdot r^6 + AG \cdot r^8 + AH \cdot r^{10}$$

TABLE 5

|  | Radius of curvature $R_D$ | Clap radius | Intersurface spacing | Refractive index |
|---|---|---|---|---|
| Spherical system |  |  |  |  |
| Screen | ∞ | 580.0 |  |  |
| First lens |  |  | 778.5 | 1.0 |
| $S_1$ | −87.423 | 58.0 |  |  |
|  |  |  | 9.0 | 1.49345 |
| $S_2$ | −116.16 | 53.75 |  |  |
| Second lens |  |  | 39.0 | 1.0 |
| $S_3$ | −74.958 | 43.5 |  |  |
|  |  |  | 21.0 | 1.59149 |
| $S_4$ | 319.83 | 41.6 |  |  |
| Third lens |  |  | 21.5 | 1.0 |
| $S_5$ | −370.67 | 36.0 |  |  |
|  |  |  | 8.0 | 1.49345 |
| $S_6$ | 155.95 | 36.0 |  |  |
| Fourth lens |  |  | 32.546 | 1.0 |
| $S_7$ | 47.564 | 40.3 |  |  |
|  |  |  | 3.4048 | 1.49345 |
| $S_8$ | 50.774 | 41.9 |  |  |
|  |  |  | 12.0 | 1.44473 |
| Transparent medium | ∞ | 72.4 |  |  |
| Glass |  |  | 13.4 | 1.53994 |
| Phosphor surface $P_1$ | 450.0 | 72.4 |  |  |

|  | CC | AE | AF | AG | AH |
|---|---|---|---|---|---|
| Aspherical system |  |  |  |  |  |
| First lens |  |  |  |  |  |
| $S_1$ | −1.4067421 | −6.4013875 × 10$^{-8}$ | 3.0181679 × 10$^{-10}$ | −5.58080991 × 10$^{-14}$ | −1.2897930 × 10$^{-18}$ |
| $S_2$ | 3.2197342 | 5.4086545 × 10$^8$ | 2.6845326 × 10$^{-10}$ | −5.4731166 × 10$^{-14}$ | 1.2709377 × 10$^{-18}$ |
| Third lens |  |  |  |  |  |
| $S_5$ | −8.0400534 | 9.2659548 × 10$^{-8}$ | −9.8153402 × 10$^{-10}$ | −3.2796243 × 10$^{-13}$ | 1.1768708 × 10$^{-16}$ |
| $S_6$ | 11.336041 | −9.5627183 × 10$^{-7}$ | −1.5141205 × 10$^{-10}$ | −5.3930677 × 10$^{-13}$ | 1.1389819 × 10$^{-16}$ |
| Fourth lens |  |  |  |  |  |
| $S_7$ | 0.19618767 | 7.1182228 × 10$^{-7}$ | −1.5682604 × 10$^{-9}$ | 7.872489 × 10$^{-13}$ | −2.177088 × 10$^{-16}$ |
| Phosphor surface $P_1$ | 0.0 | 0.0 × 10$^{-7}$ | 0.0 × 10$^{-10}$ | 0.0 × 10$^{-14}$ | 0.0 × 10$^{-19}$ |

$$Z = \frac{r^2/R_D}{1 + \sqrt{1 - (1 + CC) r^2/R_D^2}} + AE \cdot r^4 + AF \cdot r^6 + AG \cdot r^8 + AH \cdot r^{10}$$

TABLE 6

Spherical system

| | | Radius of curvature $R_D$ | Clap radius | Intersurface spacing | Refractive index |
|---|---|---|---|---|---|
| Screen | | ∞ | 580.0 | 778.5 | 1.0 |
| First | $S_1$ | 0494823703108 −104.23 | 58.0 | 9.0 | 1.49345 |
| lens | $S_2$ | −117.96 | 53.75 | 42.534 | 1.0 |
| Second | $S_3$ | −78.60 | 43.5 | 21.0 | 1.59149 |
| lens | $S_4$ | 285.61 | 41.6 | 25.016 | 1.0 |
| Third | $S_5$ | −250.20 | 36.0 | 8.0 | 1.49345 |
| lens | $S_6$ | 179.58 | 36.0 | 36.689 | 1.0 |
| Fourth | $S_7$ | 46.965 | 40.3 | 3.4048 | 1.49345 |
| lens | $S_8$ | 50.774 | 41.9 | | |
| Transparent medium Glass | | ∞ | 72.4 | 12.0 | 1.44473 |
| Phosphor surface | $P_1$ | 450.0 | 72.4 | 13.4 | 1.53994 |

Aspherical system

| | | CC | AE | AF | AG | AH |
|---|---|---|---|---|---|---|
| First | $S_1$ | −1.3965778 | $-8.9570563 \times 10^{-8}$ | $1.807392 \times 10^{-10}$ | $-5.2529358 \times 10^{-14}$ | $4.3264499 \times 10^{-18}$ |
| lens | $S_2$ | 3.0749426 | $-2.0190362 \times 10^{-7}$ | $2.1876505 \times 10^{-10}$ | $-7.9875288 \times 10^{-14}$ | $5.1476335 \times 10^{-18}$ |
| Third | $S_5$ | 21.336594 | $-3.3383841 \times 10^{-8}$ | $-1.5271083 \times 10^{-10}$ | $-2.0698650 \times 10^{-13}$ | $1.6262894 \times 10^{-16}$ |
| lens | $S_6$ | 15.076676 | $-1.0398735 \times 10^{-6}$ | $-3.1027447 \times 10^{-10}$ | $-4.1466656 \times 10^{-13}$ | $1.7967539 \times 10^{-16}$ |
| Fourth lens | $S_7$ | −0.10662705 | $8.9678522 \times 10^{-9}$ | $-5.6648997 \times 10^{-10}$ | $2.1703478 \times 10^{-13}$ | $-1.5358719 \times 10^{-17}$ |
| Phosphor surface | $P_1$ | 0 | $0.0 \times 10^{-7}$ | $0.0 \times 10^{-10}$ | $0.0 \times 10^{-14}$ | $0.0 \times 10^{-19}$ |

$$Z = \frac{r^2/R_D}{1 + \sqrt{1 - (1 + CC)r^2/R_D^2}} + AE \cdot r^4 + AF \cdot r^6 + AG \cdot r^8 + AH \cdot r^{10}$$

TABLE 7

Spherical system

| | | Radius of curvature $R_D$ | Clap radius | Intersurface spacing | Refractive index |
|---|---|---|---|---|---|
| Screen | | ∞ | 580.0 | 778.5 | 1.0 |
| First | $S_1$ | −95.507 | 58.0 | 9.0 | 1.49345 |
| lens | $S_2$ | −137.28 | 53.75 | 39.0 | 1.0 |
| Second | $S_3$ | −78.204 | 43.5 | 21.0 | 1.59149 |
| lens | $S_4$ | 252.74 | 42.7 | 21.5 | 1.0 |
| Third | $S_5$ | −329.74 | 38.0 | 8.0 | 1.49345 |
| lens | $S_6$ | 226.12 | 38.0 | 32.546 | 1.0 |
| Fourth | $S_7$ | 50.294 | 40.3 | 3.4048 | 1.49345 |
| lens | $S_8$ | 50.774 | 41.9 | | |
| Transparent medium Glass | | ∞ | 72.4 | 12.0 | 1.44473 |
| Phosphor surface | $P_1$ | 341.28 | 72.4 | 13.4 | 1.53994 |

Aspherical system

| | | CC | AE | AF | AG | AH |
|---|---|---|---|---|---|---|
| First | $S_1$ | −0.31405216 | $5.3510405 \times 10^{-7}$ | $3.6782821 \times 10^{-10}$ | $-1.0907394 \times 10^{-13}$ | $1.0528094 \times 10^{-17}$ |
| lens | $S_2$ | −2.2742186 | $-2.8972255 \times 10^{-7}$ | $8.4669771 \times 10^{-10}$ | $-2.3821843 \times 10^{-14}$ | $-1.0157272 \times 10^{-17}$ |
| Third | $S_5$ | −77.328857 | $-4.2802196 \times 10^{-7}$ | $-9.0484953 \times 10^{-10}$ | $-3.0620932 \times 10^{-13}$ | $1.2664290 \times 10^{-16}$ |
| lens | $S_6$ | 10.521872 | $-5.5100548 \times 10^{-7}$ | $-1.8200796 \times 10^{-9}$ | $2.0620203 \times 10^{-13}$ | $-1.2252637 \times 10^{-16}$ |
| Fourth lens | $S_7$ | −0.51916593 | $1.5931064 \times 10^{-8}$ | $-1.2728829 \times 10^{-9}$ | $1.035348 \times 10^{-12}$ | $-2.1327582 \times 10^{-16}$ |
| Phosphor surface | $P_1$ | 4.5813494 | $2.3355796 \times 10^{-7}$ | $-1.182420 \times 10^{-10}$ | $1.4486896 \times 10^{-14}$ | $-5.5873481 \times 10^{-19}$ |

$$Z = \frac{r^2/R_D}{1 + \sqrt{1 - (1 + CC)r^2/R_D^2}} + AE \cdot r^4 + AF \cdot r^6 + AG \cdot r^8 + AH \cdot r^{10}$$

TABLE 8

Spherical system

| | | Radius of curvature $R_D$ | Clap radius | Intersurface spacing | Refractive index |
|---|---|---|---|---|---|
| Screen | | ∞ | 580.0 | 778.5 | 1.0 |
| First | $S_1$ | −106.23 | 58.0 | 9.0 | 1.49345 |
| lens | $S_2$ | −132.73 | 53.75 | 39.0 | 1.0 |
| Second | $S_3$ | −78.80 | 43.5 | 21.0 | 1.59149 |
| lens | $S_4$ | 271.74 | 42.7 | 21.5 | 1.0 |
| Third | $S_5$ | −226.56 | 38.0 | 8.0 | 1.49345 |
| lens | $S_6$ | 283.30 | 38.0 | 37.158 | 1.0 |

TABLE 8-continued

| | | | | | |
|---|---|---|---|---|---|
| Fourth | $S_7$ | 52.281 | 40.3 | 3.4048 | 1.49345 |
| lens | $S_8$ | 50.774 | 41.9 | | |
| Transparent medium | | ∞ | 72.4 | 12.0 | 1.44473 |
| Glass | | | | | |
| Phorphor surface | $P_1$ | 341.28 | 72.4 | 13.4 | 1.53994 |

| Aspherical system | | | | | | |
|---|---|---|---|---|---|---|
| | | CC | AE | AF | AG | AH |
| First | $S_1$ | −0.80050037 | $1.3061750 \times 10^{-7}$ | $3.4377176 \times 10^{-10}$ | $-1.1214803 \times 10^{-13}$ | $1.0958841 \times 10^{-17}$ |
| lens | $S_2$ | −4.6100459 | $-2.3695516 \times 10^{-7}$ | $7.0406647 \times 10^{-11}$ | $-2.0131571 \times 10^{-14}$ | $-1.0513218 \times 10^{-17}$ |
| Third | $S_5$ | −33.935939 | $-9.4253581 \times 10^{-7}$ | $-8.2682256 \times 10^{-10}$ | $-1.2942616 \times 10^{-13}$ | $-3.4363320 \times 10^{-17}$ |
| lens | $S_6$ | −18.371008 | $-8.5233603 \times 10^{-7}$ | $-1.2652270 \times 10^{-9}$ | $-4.3056411 \times 10^{-14}$ | $-1.4505226 \times 10^{-16}$ |
| Fourth lens | $S_7$ | −0.28168626 | $1.6772188 \times 10^{-6}$ | $-9.5987513 \times 10^{-10}$ | $6.1375047 \times 10^{-13}$ | $-7.7582916 \times 10^{-17}$ |
| Phosphor surface | $P_1$ | 4.5813494 | $2.3355796 \times 10^{-7}$ | $-1.182420 \times 10^{-10}$ | $1.4486896 \times 10^{-14}$ | $-5.5873481 \times 10^{-19}$ |

$$Z = \frac{r^2/R_D}{1 + \sqrt{1 - (1 + CC)r^2/R_D^2}} + AE \cdot r^4 + AF \cdot r^6 + AG \cdot r^8 + AH \cdot r^{10}$$

TABLE 9

| Spherical system | | | | | |
|---|---|---|---|---|---|
| | | Radius of curvature $R_D$ | Clap radius | Intersurface spacing | Refractive index |
| Screen | | ∞ | 580.0 | 778.5 | 1.0 |
| First | $S_1$ | −104.86 | 58.0 | 9.0 | 1.49345 |
| lens | $S_2$ | −139.15 | 53.75 | 39.0 | 1.0 |
| Second | $S_3$ | −79.785 | 43.5 | 21.0 | 1.59149 |
| lens | $S_4$ | 244.27 | 42.7 | 24.654 | 1.0 |
| Third | $S_5$ | −223.60 | 38.0 | 8.0 | 1.49345 |
| lens | $S_6$ | 258.01 | 38.0 | 32.546 | 1.0 |
| Fourth | $S_7$ | 47.743 | 40.3 | 3.4048 | 1.49345 |
| lens | $S_8$ | 50.774 | 41.9 | | |
| Transparent medium | | ∞ | 72.4 | 12.0 | 1.44473 |
| Glass | | | | | |
| Phosphor surface | $P_1$ | 341.28 | 72.4 | 13.4 | 1.53994 |

| Aspherical system | | | | | | |
|---|---|---|---|---|---|---|
| | | CC | AE | AF | AG | AH |
| First | $S_1$ | $-2.2394071 \times 10^{-2}$ | $-4.3657103 \times 10^{-8}$ | $3.3891742 \times 10^{-10}$ | $-1.0789441 \times 10^{-13}$ | $1.1142154 \times 10^{-17}$ |
| lens | $S_2$ | −1.0874980 | $-3.4564325 \times 10^{-7}$ | $6.2375100 \times 10^{-11}$ | $-2.1995476 \times 10^{-14}$ | $-1.1536394 \times 10^{-17}$ |
| Third | $S_5$ | −0.19894290 | $-5.6583524 \times 10^{-7}$ | $-8.641425 \times 10^{-10}$ | $-1.6061285 \times 10^{-13}$ | $2.5071735 \times 10^{-17}$ |
| lens | $S_6$ | 15.642459 | $-9.5472787 \times 10^{-7}$ | $-1.4385057 \times 10^{-9}$ | $7.3680939 \times 10^{-15}$ | $-6.1848468 \times 10^{-17}$ |
| Fourth lens | $S_7$ | $-6.9071711 \times 10^{-2}$ | $5.7523983 \times 10^{-7}$ | $-6.3746665 \times 10^{-10}$ | $1.2433776 \times 10^{-13}$ | $5.9225404 \times 10^{-17}$ |
| Phosphor surface | $P_1$ | 4.5813494 | $2.3355796 \times 10^{-7}$ | $-1.182420 \times 10^{-10}$ | $1.4486896 \times 10^{-14}$ | $-5.5873481 \times 10^{-19}$ |

$$Z = \frac{r^2/R_D}{1 + \sqrt{1 - (1 + CC)r^2/R_D^2}} + AE \cdot r^4 + AF \cdot r^6 + AG \cdot r^8 + AH \cdot r^{10}$$

TABLE 10

| Spherical system | | | | | |
|---|---|---|---|---|---|
| | | Radius of curvature $R_D$ | Clap radius | Intersurface spacing | Refractive index |
| Screen | | ∞ | 580.0 | 778.5 | 1.0 |
| First | $S_1$ | −101.1 | 58.0 | 9.0 | 1.49345 |
| lens | $S_2$ | −156.7 | 53.75 | 42.438 | 1.0 |
| Second | $S_3$ | −80.153 | 43.5 | 21.0 | 1.59149 |
| lens | $S_4$ | 237.85 | 42.7 | 21.5 | 1.0 |
| Third | $S_5$ | −378.20 | 38.0 | 8.0 | 1.49345 |
| lens | $S_6$ | 226.65 | 38.0 | 32.546 | 1.0 |
| Fourth | $S_7$ | 47.304 | 40.3 | 3.4048 | 1.49345 |
| lens | $S_8$ | 50.774 | 41.9 | | |
| Transparent medium | | ∞ | 72.4 | 12.0 | 1.44473 |
| Glass | | | | | |
| Phosphor surface | $P_1$ | 341.28 | 72.4 | 13.4 | 1.53994 |

| Aspherical system | | | | | | |
|---|---|---|---|---|---|---|
| | | CC | AE | AF | AG | AH |

TABLE 10-continued

| | | | | | | |
|---|---|---|---|---|---|---|
| First lens | $S_1$ | 0.24778391 | $-1.4551084 \times 10^{-7}$ | $3.3539901 \times 10^{-10}$ | $-1.0214317 \times 10^{-13}$ | $1.1544389 \times 10^{-17}$ |
| | $S_2$ | $-0.27838080$ | $-3.9698420 \times 10^{-7}$ | $5.1643135 \times 10^{-11}$ | $-1.7429276 \times 10^{-14}$ | $-9.2179036 \times 10^{-18}$ |
| Third lens | $S_5$ | $-54.251256$ | $-5.0394037 \times 10^{-7}$ | $-7.7029813 \times 10^{-10}$ | $-1.4295799 \times 10^{-13}$ | $1.2099563 \times 10^{-16}$ |
| | $S_6$ | 24.914344 | $-9.7803284 \times 10^{-7}$ | $-1.4028424 \times 10^{-9}$ | $3.2862269 \times 10^{-14}$ | $2.8648165 \times 10^{-17}$ |
| Fourth lens | $S_7$ | $8.633285 \times 10^{-2}$ | $-4.7502706 \times 10^{-8}$ | $-5.233855 \times 10^{-10}$ | $7.5674943 \times 10^{-14}$ | $-1.1012789 \times 10^{-17}$ |
| Phosphor surface | $P_1$ | 4.5813494 | $2.3355796 \times 10^{-7}$ | $-1182420 \times 10^{-10}$ | $1.4486896 \times 10^{-14}$ | $-5.5873481 \times 10^{-19}$ |

$$Z = \frac{r^2/R_D}{1 + \sqrt{1 - (1 + CC) r^2/R_D^2}} + AE \cdot r^4 + AF \cdot r^6 + AG \cdot r^8 + AH \cdot r^{10}$$

TABLE 11

| Spherical system | | Radius of curvature $R_D$ | Clap radius | Intersurface spacing | Refractive index |
|---|---|---|---|---|---|
| Screen | | ∞ | 580.0 | | 1.0 |
| | | | | 778.5 | |
| First lens | $S_1$ | $-94.123$ | 58.0 | | |
| | | | | 9.0 | 1.49345 |
| | $S_2$ | $-139.95$ | 53.75 | | |
| | | | | 39.0 | 1.0 |
| Second lens | $S_3$ | $-82.286$ | 43.5 | | |
| | | | | 21.0 | 1.59149 |
| | $S_4$ | 211.45 | 42.7 | | |
| | | | | 21.5 | 1.0 |
| Third lens | $S_5$ | $-59188$ | 38.0 | | |
| | | | | 8.0 | 1.49345 |
| | $S_6$ | 184.34 | 38.0 | | |
| | | | | 32.546 | 1.0 |
| Fourth lens | $S_7$ | 46.165 | 40.3 | | |
| | | | | 3.4048 | 1.49345 |
| | $S_8$ | 50.774 | 41.9 | | |
| | | | | 12.0 | 1.44473 |
| Transparent medium Glass | | ∞ | 72.4 | | |
| | | | | 13.4 | 1.53994 |
| Phosphor surface | $P_1$ | 450 | 72.4 | | |

| Aspherical system | | CC | AE | AF | AG | AH |
|---|---|---|---|---|---|---|
| First lens | $S_1$ | $-0.11014238$ | $-4.0557516 \times 10^{-8}$ | $3.8034156 \times 10^{-10}$ | $-1.0467207 \times 10^{-13}$ | $1.0216441 \times 10^{-17}$ |
| | $S_2$ | $-1.1258515$ | $-3.3662629 \times 10^{-7}$ | $6.8052741 \times 10^{-11}$ | $-7.8594474 \times 10^{-15}$ | $-1.4127887 \times 10^{-17}$ |
| Third lens | $S_5$ | 73.586591 | $-4.1347599 \times 10^{-7}$ | $-9.0530258 \times 10^{-10}$ | $-1.6080478 \times 10^{-13}$ | $9.5449617 \times 10^{-17}$ |
| | $S_6$ | 15.284604 | $-1.1378840 \times 10^{-6}$ | $-1.4165990 \times 10^{-9}$ | $-5.8989424 \times 10^{-14}$ | $5.7270477 \times 10^{-18}$ |
| Fourth lens | $S_7$ | $3.282035 \times 10^{-2}$ | $2.8349061 \times 10^{-7}$ | $-9.4406705 \times 10^{-10}$ | $3.9929326 \times 10^{-13}$ | $-9.8059282 \times 10^{-17}$ |
| Phosphor surface | $P_1$ | 0.0 | $0.0 \times 10^{-7}$ | $0.0 \times 10^{-10}$ | $0.0 \times 10^{-14}$ | $0.0 \times 10^{-19}$ |

$$Z = \frac{r^2/R_D}{1 + \sqrt{1 - (1 + CC) r^2/R_D^2}} + AE \cdot r^4 + AF \cdot r^6 + AG \cdot r^8 + AH \cdot r^{10}$$

TABLE 12

| Spherical system | | Radius of curvature $R_D$ | Clap radius | Intersurface spacing | Refractive index |
|---|---|---|---|---|---|
| Screen | | ∞ | 580.0 | | |
| | | | | 778.5 | 1.0 |
| First lens | $S_1$ | $-104.23$ | 58.0 | | |
| | | | | 9.0 | 1.49345 |
| | $S_2$ | $-117.96$ | 53.75 | | |
| | | | | 42.534 | 1.0 |
| Second lens | $S_3$ | $-78.60$ | 43.5 | | |
| | | | | 21.0 | 1.59149 |
| | $S_4$ | 285.61 | 42.7 | | |
| | | | | 25.016 | 1.0 |
| Third lens | $S_5$ | $-250.20$ | 38.0 | | |
| | | | | 8.0 | 1.49345 |
| | $S_6$ | 179.58 | 38.0 | | |
| | | | | 36.689 | 1.0 |
| Fourth lens | $S_7$ | 46.965 | 40.3 | | |
| | | | | 3.4048 | 1.49345 |
| | $S_8$ | 50.774 | 41.9 | | |
| | | | | 12.0 | 1.44473 |
| Transparent medium Glass | | ∞ | 72.4 | | |
| | | | | 13.4 | 1.53994 |
| Phosphor surface | $P_1$ | 450 | 72.4 | | |

| Aspherical system | | CC | AE | AF | AG | AH |
|---|---|---|---|---|---|---|
| First lens | $S_1$ | $-1.3965778$ | $-8.9570563 \times 10^{-8}$ | $1.8073920 \times 10^{-10}$ | $-5.2529358 \times 10^{-14}$ | $4.3264499 \times 10^{-18}$ |
| | $S_2$ | 3.0749426 | $-2.0190362 \times 10^{-7}$ | $2.1876505 \times 10^{-10}$ | $-7.9875288 \times 10^{-14}$ | $5.1476335 \times 10^{-18}$ |

TABLE 12-continued

| | | | | | | | |
|---|---|---|---|---|---|---|---|
| Third | $S_5$ | 21.336594 | $-3.3383841 \times 10^{-8}$ | $-1.5271083 \times 10^{-10}$ | $-2.069865 \times 10^{-13}$ | $1.6262894 \times 10^{-16}$ | |
| lens | $S_6$ | 15.076676 | $-1.0398735 \times 10^{-6}$ | $-3.1027447 \times 10^{-10}$ | $-4.1466656 \times 10^{-13}$ | $1.7967539 \times 10^{-16}$ | |
| Fourth lens | $S_7$ | $-0.10662705$ | $8.9678522 \times 10^{-9}$ | $-5.6648997 \times 10^{-10}$ | $2.1703478 \times 10^{-13}$ | $-1.5358719 \times 10^{-17}$ | |
| Phosphor surface | $P_1$ | 0.0 | $0.0 \times 10^{-7}$ | $0.0 \times 10^{-10}$ | $0.0 \times 10^{-14}$ | $0.0 \times 10^{-19}$ | |

$$Z = \frac{r^2/R_D}{1 + \sqrt{1 - (1 + CC) r^2/R_D^2}} + AE \cdot r^4 + AF \cdot r^6 + AG \cdot r^8 + AH \cdot r^{10}$$

| Spherical system | | Radius of curvature $R_D$ | Clap radius | Intersurface spacing | Refractive index |
|---|---|---|---|---|---|
| Screen | | ∞ | 580.0 | | |
| | | | | 778.50 | 1.0 |
| First lens | $S_1$ | $-91.849$ | 58.0 | | |
| | | | | 9.00 | 1.58920 |
| | $S_2$ | $-114.790$ | 53.75 | | |
| | | | | 38.50 | 1.0 |
| Second lens | $S_3$ | $-79.006$ | 43.5 | | |
| | | | | 21.00 | 1.62293 |
| | $S_4$ | 303.96 | 41.6 | | |
| | | | | 24.00 | 1.0 |
| Third lens | $S_5$ | $-351.34$ | 36.0 | | |
| | | | | 8.00 | 1.58920 |
| | $S_6$ | 235.23 | 36.0 | | |
| | | | | 31.5 | 1.0 |
| Fourth lens | $S_7$ | 53.412 | 40.3 | | |
| | | | | 3.40 | 1.49345 |
| | $S_8$ | 50.774 | 41.9 | | |
| Transparent medium | | ∞ | 72.4 | 12.0 | 1.44473 |
| Glass | | | | 13.4 | 1.53994 |
| Phosphor surface | $P_1$ | 341.28 | 72.4 | | |

| Aspherical system | | CC | AE | AF | AG | AH |
|---|---|---|---|---|---|---|
| First | $S_1$ | $-2.5424911$ | $-2.3142626 \times 10^{-7}$ | $2.9154444 \times 10^{-10}$ | $-4.4593114 \times 10^{-14}$ | $-1.2973178 \times 10^{-18}$ |
| lens | $S_2$ | 2.7620004 | $3.1012010 \times 10^{-8}$ | $3.1581157 \times 10^{-10}$ | $-6.9982074 \times 10^{-14}$ | $3.6217214 \times 10^{-18}$ |
| Third | $S_5$ | 33.955294 | $-2.0570834 \times 10^{-7}$ | $-7.0390240 \times 10^{-11}$ | $-4.2343659 \times 10^{-13}$ | $2.0466499 \times 10^{-16}$ |
| lens | $S_6$ | 28.524313 | $-1.1312724 \times 10^{-6}$ | $-2.5546852 \times 10^{-10}$ | $-5.1923902 \times 10^{-13}$ | $1.8981851 \times 10^{-16}$ |
| Fourth lens | $S_7$ | 0.54860605 | $6.8022716 \times 10^{-7}$ | $-1.0706144 \times 10^{-9}$ | $5.7915377 \times 10^{-13}$ | $-2.1854122 \times 10^{-16}$ |
| Phosphor surface | $P_1$ | 4.5813494 | $2.3355796 \times 10^{-7}$ | $-1.182420 \times 10^{-10}$ | $1.4486896 \times 10^{-14}$ | $-5.5873481 \times 10^{-19}$ |

$$Z = \frac{r^2/R_D}{1 + \sqrt{1 - (1 + CC) r^2/R_D^2}} + AE \cdot r^4 + AF \cdot r^6 + AG \cdot r^8 + AH \cdot r^{10}$$

TABLE 14

| Spherical system | | Radius of curvature $R_D$ | Clap radius | Intersurface spacing | Refractive index |
|---|---|---|---|---|---|
| Screen | | ∞ | 600.0 | | |
| | | | | 743.87 | 1.0 |
| First lens | $S_1$ | $-92.857$ | 58.0 | | |
| | | | | 9.00 | 1.49345 |
| | $S_2$ | $-134.270$ | 53.75 | | |
| | | | | 39.0 | 1.0 |
| Second lens | $S_3$ | $-76.780$ | 43.5 | | |
| | | | | 21.0 | 1.59149 |
| | $S_4$ | 309.25 | 41.6 | | |
| | | | | 21.5 | 1.0 |
| Third lens | $S_5$ | $-418.79$ | 36.0 | | |
| | | | | 8.00 | 1.49345 |
| | $S_6$ | 158.43 | 36.0 | | |
| | | | | 31.450 | 1.0 |
| Fourth lens | $S_7$ | 50.924 | 40.3 | | |
| | | | | 3.4048 | 1.49345 |
| | $S_8$ | 50.774 | 41.9 | | |
| Transparent medium | | ∞ | 72.4 | 12.0 | 1.44473 |
| Glass | | | | 13.4 | 1.53994 |
| Phosphor surface | $P_1$ | 341.28 | 72.4 | | |

| Aspherical system | | CC | AE | AF | AG | AH |
|---|---|---|---|---|---|---|
| First | $S_1$ | $-1.1641588$ | $-1.4528285 \times 10^{-7}$ | $3.1447001 \times 10^{-10}$ | $-5.4649631 \times 10^{-14}$ | $-5.8785782 \times 10^{-19}$ |
| lens | $S_2$ | 4.3103714 | $-8.7222134 \times 10^{-8}$ | $2.4314661 \times 10^{-10}$ | $-3.7769396 \times 10^{-14}$ | $-3.1237086 \times 10^{-18}$ |
| Third | $S_5$ | $-1231.8062$ | $-4.4682167 \times 10^{-7}$ | $3.8349790 \times 10^{-10}$ | $-4.4098785 \times 10^{-13}$ | $1.6046726 \times 10^{-16}$ |
| lens | $S_6$ | 12.993199 | $-3.6081127 \times 10^{-7}$ | $-9.0829033 \times 10^{-10}$ | $1.0524188 \times 10^{-13}$ | $-3.8635979 \times 10^{-17}$ |
| Fourth lens | $S_7$ | 0.39626831 | $7.2942424 \times 10^{-7}$ | $-1.0023198 \times 10^{-9}$ | $3.4842929 \times 10^{-13}$ | $-9.8013676 \times 10^{-17}$ |

TABLE 14-continued

| | | | | | | |
|---|---|---|---|---|---|---|
| Phosphor surface | $P_1$ | 4.5813494 | $2.3355796 \times 10^{-7}$ | $-1.182420 \times 10^{-10}$ | $1.4486896 \times 10^{-14}$ | $-5.5873481 \times 10^{-19}$ |

$$Z = \frac{r^2/R_D}{1 + \sqrt{1 - (1 + CC) r^2/R_D^2}} + AE \cdot r^4 + AF \cdot r^6 + AG \cdot r^8 + AH \cdot r^{10}$$

TABLE 15

| Spherical system | | Radius of curvature $R_D$ | Clap radius | Intersurface spacing | Refractive index |
|---|---|---|---|---|---|
| Screen | | ∞ | | | |
| | | | | 692.35 | 1.0 |
| First lens | $S_1$ | −92.857 | 58.0 | | |
| | | | | 9.00 | 1.49345 |
| | $S_2$ | −134.270 | 53.75 | | |
| | | | | 39.0 | 1.0 |
| Second lens | $S_3$ | −76.780 | 43.5 | | |
| | | | | 21.0 | 1.59149 |
| | $S_4$ | 309.25 | 41.6 | | |
| | | | | 21.5 | 1.0 |
| Third lens | $S_5$ | −578.96 | 36.0 | | |
| | | | | 8.00 | 1.49345 |
| | $S_6$ | 148.62 | 36.0 | | |
| | | | | 31.450 | 1.0 |
| Fourth lens | $S_7$ | 50.924 | 40.3 | | |
| | | | | 3.4048 | 1.49345 |
| | $S_8$ | 50.774 | 41.9 | | |
| Transparent medium | | ∞ | 72.4 | 12.0 | 1.44473 |
| Glass | | | | 13.4 | 1.53994 |
| Phosphor surface | $P_1$ | 341.28 | 72.4 | | |

| Aspherical system | | CC | AE | AF | AG | AH |
|---|---|---|---|---|---|---|
| First lens | $S_1$ | −1.1641588 | $-1.4528285 \times 10^{-7}$ | $3.1447001 \times 10^{-10}$ | $-5.4649631 \times 10^{-14}$ | $5.8785782 \times 10^{-19}$ |
| | $S_2$ | 4.3103714 | $-8.7222134 \times 10^{-8}$ | $2.4314661 \times 10^{-10}$ | $-3.7769396 \times 10^{-14}$ | $-3.1237086 \times 10^{-18}$ |
| Third lens | $S_5$ | −1010.1001 | $1.6159663 \times 10^{-7}$ | $-1.0714248 \times 10^{-10}$ | $-6.3998611 \times 10^{-14}$ | $9.2463864 \times 10^{-17}$ |
| | $S_6$ | 9.7373972 | $-4.3229380 \times 10^{-7}$ | $-4.1975823 \times 10^{-10}$ | $-1.9688141 \times 10^{-13}$ | $1.1393583 \times 10^{-16}$ |
| Fourth lens | $S_7$ | 0.39626831 | $7.2942424 \times 10^{-7}$ | $-1.0023198 \times 10^{-9}$ | $3.4842929 \times 10^{-13}$ | $-9.8013676 \times 10^{-17}$ |
| Phosphor surface | $P_1$ | 4.5813494 | $2.3355796 \times 10^{-7}$ | $-1.182420 \times 10^{-10}$ | $1.4486896 \times 10^{-14}$ | $-5.5873481 \times 10^{-19}$ |

$$Z = \frac{r^2/R_D}{1 + \sqrt{1 - (1 + CC) r^2/R_D^2}} + AE \cdot r^4 + AF \cdot r^6 + AG \cdot r^8 + AH \cdot r^{10}$$

TABLE 16

| Spherical system | | Radius of curvature $R_D$ | Clap radius | Intersurface spacing | Refractive index |
|---|---|---|---|---|---|
| Screen | | ∞ | 698.5 | | |
| | | | | 778.5 | 1.0 |
| First lens | $S_1$ | −92.857 | 58.0 | | |
| | | | | 9.00 | 1.49345 |
| | $S_2$ | −134.270 | 53.75 | | |
| | | | | 39.0 | 1.0 |
| Second lens | $S_3$ | −76.780 | 43.5 | | |
| | | | | 21.0 | 1.59149 |
| | $S_4$ | 309.25 | 41.6 | | |
| | | | | 21.5 | 1.0 |
| Third lens | $S_5$ | −422.42 | 36.0 | | |
| | | | | 8.00 | 1.49345 |
| | $S_6$ | 171.34 | 36.0 | | |
| | | | | 31.450 | 1.0 |
| Fourth lens | $S_7$ | 50.924 | 40.3 | | |
| | | | | 3.4048 | 1.49345 |
| | $S_8$ | 50.774 | 41.9 | | |
| Transparent medium | | ∞ | 72.4 | 12.0 | 1.44473 |
| Glass | | | | 13.4 | 1.53994 |
| Phosphor surface | $P_1$ | 341.28 | 72.4 | | |

| Aspherical system | | CC | AE | AF | AG | AH |
|---|---|---|---|---|---|---|
| First lens | $S_1$ | −1.1641588 | $-1.4528285 \times 10^{-7}$ | $3.1447001 \times 10^{-10}$ | $-5.4649631 \times 10^{-14}$ | $-5.8785782 \times 10^{-19}$ |
| | $S_2$ | 4.3103714 | $-8.7222134 \times 10^{-8}$ | $2.4314661 \times 10^{-10}$ | $-3.7769396 \times 10^{-14}$ | $-3.1237086 \times 10^{-18}$ |
| Third lens | $S_5$ | 14.447261 | $-4.1937017 \times 10^{-7}$ | $2.561320 \times 10^{-10}$ | $-8.2923734 \times 10^{-13}$ | $2.8305872 \times 10^{-16}$ |
| | $S_6$ | 16.220520 | $-9.0746579 \times 10^{-7}$ | $-9.320833 \times 10^{-10}$ | $-1.2561902 \times 10^{-13}$ | $-2.7053359 \times 10^{-17}$ |
| Fourth lens | $S_7$ | 0.39626831 | $7.2942424 \times 10^{-7}$ | $-1.0023198 \times 10^{-9}$ | $3.4842929 \times 10^{-13}$ | $-9.8013676 \times 10^{-17}$ |
| Phosphor | $P_1$ | 4.5813494 | $2.3355796 \times 10^{-7}$ | $-1.182420 \times 10^{-10}$ | $1.4486896 \times 10^{-14}$ | $-5.5873481 \times 10^{-19}$ |

TABLE 16-continued surface $$Z = \frac{r^2/R_D}{1 + \sqrt{1 - (1 + CC) r^2/R_D^2}} + AE \cdot r^4 + AF \cdot r^6 + AG \cdot r^8 + AH \cdot r^{10}$$

TABLE 17

Spherical system

| | | Radius of curvature $R_D$ | Clap radius | Intersurface spacing | Refractive index |
|---|---|---|---|---|---|
| Screen | | ∞ | 580.0 | 778.5 | 1.0 |
| First | $S_1$ | −90.591 | 58.0 | 9.0 | 1.49345 |
| lens | $S_2$ | −123.05 | 53.75 | 39.0 | 1.0 |
| Second | $S_3$ | −75.235 | 46.0 | 23.0 | 1.59149 |
| lens | $S_4$ | 317.11 | 45.1 | 21.5 | 1.0 |
| Third | $S_5$ | −413.78 | 36.0 | 8.0 | 1.49345 |
| lens | $S_6$ | 165.41 | 36.0 | 32.546 | 1.0 |
| Fourth | $S_7$ | 50.924 | 40.3 | 3.4048 | 1.49345 |
| lens | $S_8$ | 50.774 | 41.9 | | |
| Transparent medium | | ∞ | 72.4 | 12.0 | 1.44473 |
| Glass | | | | | |
| Phosphor surface | $P_1$ | 341.28 | 72.4 | 13.4 | 1.53994 |

Aspherical system

| | | CC | AE | AF | AG | AH |
|---|---|---|---|---|---|---|
| First | $S_1$ | −1.2859335 | −7.5659557 × $10^{-8}$ | 2.6409963 × $10^{-10}$ | −5.2932237 × $10^{-14}$ | 6.2323411 × $10^{-19}$ |
| lens | $S_2$ | 3.4412994 | 1.0482367 × $10^{-8}$ | 2.2305685 × $10^{-10}$ | −4.9605316 × $10^{-14}$ | 6.5963104 × $10^{-20}$ |
| Third | $S_5$ | 17.817551 | 2.3012700 × $10^{-7}$ | −4.0447479 × $10^{-11}$ | −2.5752534 × $10^{-13}$ | 1.175621 × $10^{-16}$ |
| lens | $S_6$ | 10.841446 | −7.6284545 × $10^{-7}$ | −9.5223537 × $10^{-11}$ | −4.8961611 × $10^{-13}$ | 1.5507707 × $10^{-16}$ |
| Fourth lens | $S_7$ | 0.3524362 | 6.3508338 × $10^{-7}$ | −1.053146 × $10^{-9}$ | 4.5824705 × $10^{-}$ | −1.3755452 × $10^{-16}$ |
| Phosphor surface | $P_1$ | 4.5813494 | 2.3355796 × $10^{-7}$ | −1.182420 × $10^{-10}$ | 1.4486896 × $10^{-14}$ | −5.5873481 × $10^{-19}$ |

$$Z = \frac{r^2/R_D}{1 + \sqrt{1 - (1 + CC)r^2/R_D^2}} + AE \cdot r^4 + AF \cdot r^6 + AG \cdot r^8 + AH \cdot r^{10}$$

TABLE 18

| Example No. | Power distribution of constituent lenses | | | | $l_{67}/l_{45}$ | $D_2/L_0$ | $l_{23}/f_0$ | $D_2/D_4$ | $D_4/D_6$ | Edge brightness |
|---|---|---|---|---|---|---|---|---|---|---|
| | $f_0/f_1$ | $f_0/f_2$ | $f_0/f_3$ | $f_0/f_4$ | | | | | | |
| 1 | 0.1555 | 0.8338 | 0.3679 | −0.6069 | 1.514 | 0.673 | 0.441 | 1.292 | 1.156 | 35% |
| 2 | 0.0674 | 0.8325 | 0.4104 | −0.5433 | 1.807 | 0.647 | 0.437 | 1.292 | 1.156 | 40% |
| 3 | 0.0948 | 0.8452 | 0.4221 | −0.6454 | 1.299 | 0.658 | 0.441 | 1.292 | 1.156 | 37% |
| 4 | 0.1406 | 0.8452 | 0.3846 | −0.6525 | 1.514 | 0.655 | 0.485 | 1.292 | 1.156 | 33% |
| 5 | 0.1354 | 0.8390 | 0.3930 | −0.7006 | 1.514 | 0.673 | 0.444 | 1.292 | 1.156 | 36% |
| 6 | 0.0604 | 0.8466 | 0.4229 | −0.7304 | 1.467 | 0.629 | 0.472 | 1.292 | 1.156 | 37% |
| 7 | 0.1506 | 0.8649 | 0.3275 | −0.6239 | 1.514 | 0.673 | 0.436 | 1.259 | 1.124 | 34% |
| 8 | 0.0934 | 0.8575 | 0.3532 | −0.5991 | 1.728 | 0.654 | 0.431 | 1.259 | 1.124 | 37% |
| 9 | 0.1135 | 0.8647 | 0.3691 | −0.6741 | 1.320 | 0.660 | 0.433 | 1.259 | 1.124 | 34% |
| 10 | 0.1644 | 0.8670 | 0.3123 | −0.6824 | 1.728 | 0.662 | 0.471 | 1.259 | 1.124 | 33% |
| 11 | 0.1642 | 0.8733 | 0.3143 | −0.7438 | 1.728 | 0.673 | 0.434 | 1.259 | 1.124 | 34% |
| 12 | 0.0604 | 0.8468 | 0.4230 | −0.7305 | 1.467 | 0.629 | 0.472 | 1.259 | 1.124 | 37% |
| 13 | 0.1294 | 0.8571 | 0.3667 | −0.5659 | 1.313 | 0.669 | 0.437 | 1.292 | 1.156 | 36% |
| 14 | 0.1547 | 0.8299 | 0.3764 | −0.6040 | 1.530 | 0.677 | 0.4341 | 1.292 | 1.156 | 35% |
| 15 | 0.1549 | 0.8308 | 0.3666 | 0.6047 | 1.578 | 0.667 | 0.4423 | 1.292 | 1.156 | 35% |
| 16 | 0.1572 | 0.8432 | 0.3607 | 0.6137 | 1.514 | 0.6725 | 0.4358 | 1.292 | 1.156 | 35% |
| 17 | 0.1399 | 0.8487 | 0.3707 | −0.6117 | 1.514 | 0.664 | 0.437 | 1.192 | 1.253 | 31% |

$f_0$: Focal length of all system
$f_1$: Focal length of the first group
$f_2$: Focal length of the second group
$f_3$: Focal length of the third group
$f_4$: Focal length of the fourth group
$l_{23}$: Intersurface spacing of second and third surfaces
$l_{45}$: Intersurface spacing of fourth and fifth surfaces
$l_{67}$: Intersurface spacing of sixth and seventh surfaces
$L_0$: Overall length of lens
$D_2$: Effective dia. of the second surface
$D_4$: Effective dia. of the fourth surface
$D_6$: Effective dia. of the sixth surface

TABLE 19

| Example No. | Surface A of first lens | | | Surface B of first lens | | |
|---|---|---|---|---|---|---|
| | Spherical surface: Ss Sag (mm) | Aspherical surface: As Sag (mm) | As/Ss | Spherical surface: Ss Sag (mm) | Aspherical surface: As Sag (mm) | As/Ss |
| 1 | −11.2281 | −13.6497 | 1.2157 | −20.3421 | −14.7573 | 0.7255 |
| 2 | −11.5071 | −16.0459 | 1.3944 | −16.2206 | −11.8643 | 0.7314 |
| 3 | −12.5196 | −17.0922 | 1.3652 | −18.8694 | −14.7628 | 0.7824 |
| 4 | −11.7324 | −14.8612 | 1.2667 | −20.1749 | −15.9203 | 0.7891 |
| 5 | −13.1842 | −15.8401 | 1.2014 | −22.0106 | −15.2922 | 0.6948 |
| 6 | −12.9577 | −18.5294 | 1.4300 | −17.6275 | −14.6662 | 0.8320 |
| 7 | −10.9604 | −14.1342 | 1.2896 | −19.6281 | −14.2625 | 0.7266 |
| 8 | −11.3701 | −13.4222 | 1.1805 | −17.2307 | −11.1518 | 0.6472 |
| 9 | −10.8000 | −15.5825 | 1.4428 | −17.5014 | −14.0714 | 0.8040 |
| 10 | −9.5069 | −14.5607 | 1.5316 | −18.2920 | −15.8097 | 0.8643 |
| 11 | −10.7336 | −14.8343 | 1.3820 | −19.9937 | −14.6890 | 0.7347 |
| 12 | −12.9577 | −18.5294 | 1.4300 | −17.6275 | −14.6661 | 0.8320 |
| 13 | −13.3614 | −14.0136 | 1.0488 | −20.6293 | −13.9183 | 0.6747 |
| 14 | −11.2281 | −13.6497 | 1.2157 | −20.3421 | −14.7573 | 0.7255 |
| 15 | −11.2281 | −13.6497 | 1.2157 | −20.3421 | −14.7573 | 0.7255 |
| 16 | −11.2281 | −13.6497 | 1.2157 | −20.3421 | −14.7573 | 0.7255 |
| 17 | −12.3606 | −14.8613 | 1.2023 | −21.0012 | −15.3651 | 0.8269 |

Surface A: CRT-side surface
Surface B: Screen-side surface

TABLE 20

| Example No. | Surface A of third lens | | | Surface B of third lens | | |
|---|---|---|---|---|---|---|
| | Spherical surface: Ss Sag (mm) | Aspherical surface: As Sag (mm) | As/Ss | Spherical surface: Ss Sag (mm) | Aspherical surface: As Sag (mm) | As/Ss |
| 1 | 3.9650 | 1.8445 | 0.4652 | −1.5690 | −2.3073 | 1.4706 |
| 2 | 4.2527 | 3.0513 | 0.7175 | −1.8788 | −2.0462 | 1.0891 |
| 3 | 3.4962 | 1.7986 | 0.5144 | −2.8574 | −3.1434 | 1.1001 |
| 4 | 3.3522 | 1.7209 | 0.5134 | −2.3806 | −2.5155 | 1.0567 |
| 5 | 4.2122 | 2.2014 | 0.5226 | −1.7523 | −2.2731 | 1.2972 |
| 6 | 3.6453 | 1.5899 | 0.4361 | −2.6034 | −3.3664 | 1.2931 |
| 7 | 3.2158 | −2.9956 | −0.9315 | −2.1969 | −5.9635 | 2.7145 |
| 8 | 2.5601 | −4.3091 | −1.6832 | −3.2095 | −7.9023 | 2.4621 |
| 9 | 2.8137 | −3.5679 | −1.2681 | −3.2526 | −7.5705 | 2.3275 |
| 10 | 3.9593 | −1.8207 | −0.4598 | −1.2211 | −5.0194 | 4.1105 |
| 11 | 3.9593 | −1.8207 | −0.4598 | −1.2211 | −5.0194 | 4.1105 |
| 12 | 4.0665 | 1.4805 | 0.3641 | −2.9025 | −3.8107 | 1.3129 |
| 13 | 2.7710 | 0.3150 | 0.1137 | −1.8493 | −2.9993 | 1.6219 |
| 14 | 4.1445 | 2.9307 | 0.7071 | −1.5502 | −1.3139 | 0.8476 |
| 15 | 4.4261 | 3.6435 | 0.8232 | −1.1203 | −0.5008 | 0.4470 |
| 16 | 3.8245 | 1.0708 | 0.2800 | −1.5368 | −3.0310 | 1.9723 |
| 17 | 3.9650 | 2.4094 | 0.6077 | −1.5690 | −1.6244 | 1.0353 |

Surface A: CRT-side surface
Surface B: Screen-side surface

Claims:

1. A projection type television lens system comprising, successively from a screen side, a first lens group including a meniscus lens which is convex on the screen side, a second lens group including a positive lens which is convex on both sides, a third lens group including a lens which is centrally convex on both sides and has a weak, positive refracting power, and a fourth lens group including a negative lens which is concave on the screen side, said projection type television lens system satisfying the following conditions:

$0.06 < f_0/f_1 < 0.17$
$0.82 < f_0/f_2 < 0.87$
$0.31 < f_0/f_3 < 0.43$
$-0.75 < f_0/f_4 < -0.54$ where,
$f_0$: focal length of the entire lens system
$f_1$: focal length of the first lens group
$f_2$: focal length of the second lens group
$f_3$: focal length of the third lens group
$f_4$: focal length of the fourth lens group.

2. A projection type television lens system according to claim 1, wherein the lenses constituting said first, third and fourth lens groups are aspherical each at least at one side thereof.

3. A projection type television lens system according to claim 1 or claim 2, wherein at least one of the lenses constituting the first lens group has an aspherical quantity of its second lens group-side surface which quantity has the following relationship, provided the aspherical quantity is assumed to be As/Ss where As and Ss represent aspherical and spherical sag quantities, respectively:

$1.04 < As/Ss$.

4. A projection type television lens system according to claim 1 or claim 2, wherein at least one of the lenses constituting the first lens group has an aspherical quantity of its screen-side surface which quantity has the following relationship, provided the aspherical quantity is assumed to be As/Ss where As and Ss represent aspherical and spherical sag quantities, respectively:

$0.64 < As/Ss$.

5. A projection type television lens system according to claim 1 or claim 2, at least one of the lenses constituting the third lens group has an aspherical quantity of its fourth group-side surface which quantity has the following relationship, provided the aspherical quantity is assumed to be As/Ss where As and Ss represent aspherical and spherical sag quantities, respectively:

$$-1.70 < As/Ss.$$

6. A projection type television lens system according to claim 1 or claim 2, wherein at least one of the lenses constituting the third lens group has an aspherical quantity of its second lens group-side surface which quantity has the following relationship, provided the aspherical quantity is assumed to be As/Ss where As and Ss represent aspherical and spherical sag quantities, respectively:

$$0.44 < As/Ss.$$

7. A projection type television lens system according to claim 1, wherein an intersurface spacing $l_{67}$ between the third and the fourth lens group and that $l_{45}$ between the second and the third lens group have the following relationship:

$$1.29 < l_{67}/l_{45}.$$

8. A projection type television lens system according to claim 1 or claim 2, wherein an intersurface spacing $l_{34}$ of the lenses constituting the first and the second lens group has the following relationship to the focal length $f_0$ of the entire lens system:

$$l_{34}/f_0 < 0.49.$$

9. A projection type television lens system comprising, successively from a screen side, a first lens group including a meniscus lens which is convex on both sides with respect to the screen, a second lens group including a positive lens which is convex on both sides, a third lens group which is centrally convex on both sides and has a weak, positive refracting power, and a fourth lens group including a negative lens which is concave on the screen side, wherein the ratio of a second lens group-side surface clap diameter $D_2$ of said first lens group to a third lens group-side surface clap diameter $D_4$ of said second lens group, i.e., $D_2/D_4$, and a spacing $l_{23}$ between lens surfaces of said first and second lens groups satisfy the following relationships with respect to a focal length $f_0$ of the entire lens system:

$$1.19 < D_2/D_4 < 1.30$$
$$0.40 < l_{23}/f_0 < 0.50.$$

10. A projection type television lens system according to claim 9, wherein said clap diameter $D_2$ and a lens length $L_0$ have a relationship which satisfies the following condition:

$$0.6 < D_2/L_0.$$

11. A projection type television lens system comprising, successively from a screen side, a first lens group including a meniscus lens which is convex on both sides with respect to the screen, a second lens group including a positive lens which is convex on both sides, a third lens group which is centrally convex on both sides and has a weak, positive refracting power, and a fourth lens group including a negative lens which is concave on the screen side, wherein the ratio of a third lens group-side surface diameter $D_4$ of said second lens group to a fourth lens group-side surface diameter $D_6$ of said third lens group, i.e., $D_4/D_6$, and the ratio of a spacing $l_{67}$ between said third and fourth lens groups to a spacing $l_{45}$ between said second and third lens groups, i.e., $l_{67}/l_{45}$, satisfy the following conditions:

$$1.29 < l_{67}/l_{45} < 1.81$$
$$1.15 < D_4/D_6 < 1.26.$$

12. A projection type television lens system comprising, successively from a screen side, a first lens group including a meniscus lens which is convex on both sides with respect to the screen side, a second lens group including a positive lens which is convex on both sides, a third lens group including a lens which is centrally convex on both sides and has a weak, positive refracting power, and a fourth lens group including a negative lens which is concave on the screen side, wherein a second lens group-side surface diameter $D_2$ of said first lens group, a third lens group-side surface diameter $D_4$ of said second lens group and a fourth lens group-side surface diameter $D_6$ of said third lens group are in a relationship which satisfies the following condition:

$$D_6 < D_4 < D_2.$$

13. A projection type television lens system comprising, successively from a screen side, a first lens group including a meniscus lens which is convex on both sides with respect to the screen, a second lens group including a positive lens which is convex on both sides, a third lens group which is centrally convex on both sides and has a weak, positive refracting power, and a fourth lens group including a negative lens which is concave on the screen side, said first and third lens groups each including at least one polycarbonate lens, and said fourth lens group including at least one polymethyl methacrylate lens.

14. A projection type television lens system for projecting an image on a phosphor surface onto a screen, including a lens group which includes at least a phosphor surface, characterized in that said lens group is composed of, successively from a screen side, a meniscus lens which is concave on the screen side, a transparent medium and a glass phosphor surface, that if a refractive index of the concave meniscus lens, that of the transparent medium and that of the glass phosphor surface are $N_1$, $N_2$ and $N_3$, respectively, there exists the following relationship:

$$N_2 \leq N_1 \leq N_3.$$

and that if an average radius of curvature of an air-side surface of the concave meniscus lens is $R_{D3}$, the distance from the phosphor surface to the air-side surface of the concave meniscus lens is $l_1$, an average radius of curvature of the phosphor surface is $R_{D0}$, an angle of a light emitted from a center of the phosphor surface with respect to an optical axis is $\theta$, and an angle of incidence of the light on the air-side surface of the concave meniscus lens is $\gamma$, a height H from the center of the phosphor surface determined by the following formula has the following relation to a height $L_1$ of an effective raster region of the phosphor surface:

$$H \geq 0.8 \ L_1$$

where, $H = H' - (H')^2/2 \ R_{D0}$ $$h = R_{D3}/\tan \theta - \sqrt{(R_{D3}/\tan \theta)^2 - 2 R_{D3} \ l_1}$$

-continued
$$H' = h + (l_1 + (R_{D3}(1 - \cos \delta)))\tan(\theta + 2\gamma)$$
$$\gamma = \theta + \delta = \sin^{-1}(l/N_1), \delta = \sin^{-1}(h/R_{D3}).$$

15. A projection type television lens system according to claim 14, wherein said phosphor surface has a shape which is convex on the side of an electron gun.

16. A projection type television lens system according to claim 14 or claim 15, wherein said phosphor surface is of a shape having a center of curvature on the screen side and a radius of curvature which is larger at a peripheral portion than at a central portion.

17. A projection type television lens system according to claim 14, comprising four lens groups, of which the fourth lens group is composed of, successively from the screen side, a meniscus lens having a refractive index of $N_1$ and being concave on the screen side, a transparent medium having a refractive index of $N_2$ and a glass phosphor surface having a refractive index of $N_3$, said refractive indices satisfying the relation of $N_1 \leq N_2 \leq N_3$, the other lens groups comprising a third lens group including a lens which is centrally convex on both sides and has a weak, positive refracting power, a second lens group including a lens which is convex on both sides and has a positive refracting power and a first lens group including a meniscus lens which is convex on both sides on the screen side, said lens groups satisfying the following conditions:

$0.06 < f_0/f_1 < 0.17$
$0.82 < f_0/f_2 < 0.87$
$0.31 < f_0/f_3 < 0.43$
$-0.75 < f_0/f_4 < -0.54$ where,
$f_0$: focal length of the entire lens system
$f_1$: focal length of the first lens group
$f_2$: focal length of the second lens group
$f_3$: focal length of the third lens group
$f_4$: focal length of the fourth lens group.

18. An optical system for enlarging an image produced on a phosphor surface of a CRT onto a screen, comprising from its screen side:
first lens means for correcting a spherical aberration depending on the aperture; second lens means for providing the major portion of the enlargement provided by the optical system; and third lens means including a concave lens for correcting a field curvature, said concave lens being so spaced from said CRT in the optical axis that a light emitted from a center of said phosphor surface, reflected toward said CRT at a screen side surface of said concave lens, and reflected again at an outer region of said phosphor surface which occupies at most 20% of an effective raster region of said phosphor surface does not path through said optical system.

19. An optical system for projecting an image reproduced at a reproducing device onto a screen comprising from a screen side:
a first meniscus lens which is convex to the screen side and having an aspherical surface;
a second positive lens having a first power of enlargement for projection by the optical system;
a third lens having a bi-convex center portion and having a second power of enlargement less than the first power;
a fourth negative lens optically coupled to the reproducing device and having a concave surface on the screen side, and
wherein an intersurface spacing $l_{67}$ between the third and fourth lens and an intersurface spacing $l_{45}$ between said second and third lens having the following relationship:

$1.29 < l_{67}/l_{45}$.

20. An optical system for projecting an image reproduced at a reproducing device onto a screen comprising from a screen side:
a first meniscus lens which is convex to the screen side and having an aspherical surface;
a second positive lens having a first power of enlargement for projection by the optical system;
a third lens having a bi-convex center portion and having a second power of enlargement less than the first power, a space between the second and third lenses being smaller than a space between said first and second lenses; and
a fourth negative lens optically coupled to the reproducing device and having a concave surface on the screen side.

21. An optical system for enlarging an image reproduced in a cathode ray tube and projecting the image onto a screen, comprising:
a first lens group including a face glass of the cathode ray tube, the face glass having an inner surface on which phosphor elements are disposed and an outer surface and having a refractive index NF;
a meniscus lens of a refractive index NM not greater than NF having a convex surface to the face glass of the cathode ray tube and a concave surface on the screen side, and
a transparent medium of refractive index NT not greater than NM confined between the outer surface of the cathode ray tube and the convex surface of the meniscus lens; and wherein
a relationship between a height H from the center of the concave surface of the meniscus lens and a height $L_1$ of a raster region of the inner surface of the face glass is $H \geq 0.8\ L_1$ where, $H = H' - (H')^2/2\ R_{D0}$ $h = R_{D3}/\tan\theta - \sqrt{(R_{D3}/\tan\theta)^2 - 2\ R_{D3}\ l_1}$ $H' = h + (l_1 + (R_{D3}(1 - \cos\delta)))\tan(\theta + 2\gamma)$ $\gamma = \theta + \delta = \sin^{-1}(l/N_1), \delta = \sin^{-1}(h/R_{D3})$ wherein $R_{D3}$ is an average radius of curvature of the concave surface of the meniscus lens; $l_1$ is the distance between the inner surface of the face glass and the concave surface of the meniscus lens along an optical axis of the optical system, $F_{D0}$ is an average radius of curvature of the inner surface of the face glass, $\theta$ is an angle of a light emitted from a center of the inner surface of the face glass with respect to the optical axis, and $\gamma$ is an angle of incidence of the light on the concave surface of the meniscus lens; and
a second lens group for projecting the light passed through the first lens group to the screen.

* * * * *